(12) United States Patent
Zhang et al.

(10) Patent No.: US 10,484,712 B2
(45) Date of Patent: Nov. 19, 2019

(54) IMPLICIT CODING OF REFERENCE LINE INDEX USED IN INTRA PREDICTION

(71) Applicant: QUALCOMM Incorporated, San Diego, CA (US)

(72) Inventors: Li Zhang, San Diego, CA (US); Xiang Li, San Diego, CA (US); Wei-Jung Chien, San Diego, CA (US); Jianle Chen, San Diego, CA (US); Xin Zhao, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 15/616,853

(22) Filed: Jun. 7, 2017

(65) Prior Publication Data

US 2017/0359595 A1 Dec. 14, 2017

Related U.S. Application Data

(60) Provisional application No. 62/347,545, filed on Jun. 8, 2016.

(51) Int. Cl.
*H04N 19/587* (2014.01)
*H04N 19/593* (2014.01)
(Continued)

(52) U.S. Cl.
CPC ......... *H04N 19/587* (2014.11); *H04N 19/159* (2014.11); *H04N 19/176* (2014.11);
(Continued)

(58) Field of Classification Search
CPC .. H04N 19/587; H04N 19/593; H04N 19/159; H04N 19/186; H04N 19/176; H04N 19/44
See application file for complete search history.

(56) References Cited

U.S. PATENT DOCUMENTS 9,661,337 B2 * 5/2017 Chen .................... H04N 19/593
9,723,327 B2 * 8/2017 Budagavi ............... H04N 19/11
(Continued)

FOREIGN PATENT DOCUMENTS

WO 2014154094 A1 10/2014

OTHER PUBLICATIONS

Wang et al., "High Efficiency Video Coding (HEVC) Defect Report," Joint Collaborative Team on Video Coding (JCF-VC) of ITU-T SG 16 WP 3 and ISO/IEC JTC 1/SC 29/ WG 11, 14th Meeting, Vienna, AT, Jul. 25-Aug. 2, 2013, JCTVC-N1003-v1, 311 pp.
(Continued)

*Primary Examiner* — Tat C Chio
(74) *Attorney, Agent, or Firm* — Shumaker & Sieffert, P.A.

(57) ABSTRACT

A device for decoding video data determines that a current block of video data is coded using a linear model prediction mode; for the luma component of the current block, determines reconstructed luma samples; based on luma samples in a luma component of one or more already decoded neighboring blocks and chroma samples in a chroma component of the one or more already decoded neighboring blocks, determines values for linear parameters, wherein the luma samples in the luma component of the one or more already decoded neighboring blocks comprise luma samples from a starting line in the luma component of the one or more already decoded neighboring blocks, wherein the starting line in the luma component of the one or more already decoded neighboring blocks is at least one line removed from a border line of the luma component of the current block.

30 Claims, 19 Drawing Sheets

(51) Int. Cl.
H04N 19/159 (2014.01)
H04N 19/176 (2014.01)
H04N 19/186 (2014.01)
H04N 19/44 (2014.01)

(52) U.S. Cl.
CPC .......... *H04N 19/186* (2014.11); *H04N 19/44* (2014.11); *H04N 19/593* (2014.11)

(56) References Cited

U.S. PATENT DOCUMENTS

| | | | | |
|---|---|---|---|---|
| 2015/0334389 | A1* | 11/2015 | Sato | H04N 19/103 375/240.16 |
| 2017/0347102 | A1* | 11/2017 | Panusopone | H04N 19/126 |
| 2018/0146211 | A1 | 5/2018 | Zhang et al. | |

OTHER PUBLICATIONS

Boyce et al., "Draft high efficiency video coding (HEVC) version 2, combined format range extensions (RExt), scalability (SHVC), and multi-view (MV-HEVC) extensions," Joint Collaborative Team on Video Coding (JCT-VC) of ITU-T SG 16 WP 3 and ISO/IEC JTC 1/ SC 29/ WG 11, 18th Meeting: Sapporo, JP, Jun. 30-Jul. 9, 2014, JCTVC-R1013-v6, 545 pp.

Chen et al., "CE6.A.4: Chroma intra prediction by reconstructed luma samples," Joint Collaborative Team on Video Coding (JCT-VC) of ITU-T SG16 WP3 and ISO/IEC JTC1/SC29/WG11, JCTVC-E266, 5th Meeting: Geneva, Mar. 16-23, 2011, 10 pp.

Chiu et al., "Cross-channel techniques to improve intra chroma prediction," Joint Collaborative Team on Video Coding (JCT-VC) of ITUT SG16 WP3 and ISO/IEC JTC1/SC29/WG11, JCTVC-F502, 6th Meeting: Torino, IT, Jul. 14-22, 2011, 6 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.263, Series H: Audiovisual and Multimedia Systems, Infrastructure of audiovisual services—Coding of moving video, Video coding for low bit rate communication, The International Telecommunication Union, Jan. 2005, 226 pp.

ITU-T H.262, Series H: Audiovisual and Multimedia Systems, Infrastructure of audiovisual services—Coding of moving video, Information technology—Generic coding of moving pictures and associated audio information: Video, The International Telecommunication Union, Feb. 2000, 220 pp.

ITU-T H.261, Line Transmission of Non-Telephone Signals, Video Codec for Audiovisual Services At p x 64 kbits, The International Telecommunication Union, Mar. 1993, 29 pp.

Li et al. "Multiple line-based intra prediction" Joint Video Exploration Team (JVET) of ITU-T SG 16 WP 3 and ISO/IEC JTC 1/SC 29/WG 11, 3rd Meeting: Geneva, CH, May 26-Jun. 1, 2016, JVET-00071-V2, 6 pp.

Chang et al. "Arbitrary reference tier for intra directional modes" Joint Video Exploration Team (JVET) of ITU-T SG 16 WP 2 and ISO/IEC JTC 1/SC 29/WG 11, 3rd Meeting: Geneva, CH, May 26-Jun. 1, 2016, JVET-00043-v2, 5 pp.

Chen et al., "Algorithm description of Joint Exploration Test Model 2," Joint Video Exploration Team (JVET) of ITU-T SG 16 WP 3nad ISO/IEC JTC 1/SC 29/WG 11, 2nd Meeting: San Diego, USA, Feb. 20-26, 2016, JVET-B1001, Mar. 25, 2016, 32 pp.

An et al., "Block partitioning structure for next generation video coding," International Telecommunication Union, COM16-C966-E, Oct. 2015, 7 pp.

Response to Written Opinion dated Oct. 12, 2017 from International Application No. PCT/US2017/036586, filed on Apr. 6, 2018, 3 pp.

International Preliminary Report on Patentability from International Application No. PCT/US2017/036586, dated May 22, 2018, 18 pp.

International Search Report and Written Opinion—PCT/US2017/036586—ISA/EPO—dated Oct. 12, 2017 15 pages.

Kim J., et al., "New Intra Chroma Prediction Using Inter Channel Correlation," 2 JCT-VC Meeting; Jul. 21-28, 2010; Geneva; (Joint Collaborative Team on Video Coding of ISO/IEC JTC1/SC29/WG11 and ITU-T SG.16 ); URL:http://wftp3.itu.int/av-arch/jctvc-site/, No. JCTVC-B021, Jul. 23, 2010, XP030007601, 9 pp.

Matsuo S., et al., "Extension of Intra Prediction Using Multiple Reference Lines," 32nd VCEG Meeting; 80, MPEG Meeting; Apr. 23-27, 2007; San Jose; (Video Coding Experts Group of ITU-T SG.16), No. VCEG-4F05, Apr. 19, 2007, XP030003526, 7 pp.

U.S. Appl. No. 15/874,565, filed by Li Zhang, et al., filed Jan. 18, 2018.

* cited by examiner

IMPLICIT CODING OF REFERENCE LINE INDEX USED IN INTRA PREDICTION

This Application claims the benefits of U.S. Provisional Patent Application No. 62/347,545, filed 8 Jun. 2016, the entire content of which is hereby incorporated by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized.

SUMMARY

This disclosure describes techniques related to linear model (LM) prediction decoding and encoding.

According to one example, a method for decoding video data includes determining that a current block of video data is coded using a linear model prediction mode, wherein the linear model prediction mode is used to predict a chroma component of the current block, wherein the current block comprises a luma component and at least one chroma component including the chroma component predicted using the linear model prediction mode; for the luma component of the current block, determining reconstructed luma samples; based on luma samples in a luma component of one or more already decoded neighboring blocks and chroma samples in a chroma component of the one or more already decoded neighboring blocks, determining values for linear parameters, wherein the luma samples in the luma component of the one or more already decoded neighboring blocks comprise luma samples from a starting line in the luma component of the one or more already decoded neighboring blocks, wherein the starting line in the luma component of the one or more already decoded neighboring blocks is at least one line removed from a border line of the luma component of the current block; based on the linear parameters and the reconstructed luma samples, generating prediction chroma samples for the chroma component of the current block; and reconstructing the chroma component of the current block based on the generated prediction chroma samples and received residual data.

According to another example, a device for decoding video data includes one or more memory devices; and one or more processors configured to determine that a current block of video data is coded using a linear model prediction mode, wherein the linear model prediction mode is used to predict a chroma component of the current block, wherein the current block comprises a luma component and at least one chroma component including the chroma component predicted using the linear model prediction mode; for the luma component of the current block, determine reconstructed luma samples; based on luma samples in a luma component of one or more already decoded neighboring blocks and chroma samples in a chroma component of the one or more already decoded neighboring blocks, determine values for linear parameters, wherein the luma samples in the luma component of the one or more already decoded neighboring blocks comprise luma samples from a starting line in the luma component of the one or more already decoded neighboring blocks, wherein the starting line in the luma component of the one or more already decoded neighboring blocks is at least one line removed from a border line of the luma component of the current block; based on the linear parameters and the reconstructed luma samples, generate prediction chroma samples for the chroma component of the current block; and reconstruct the chroma component of the current block based on the generated prediction chroma samples and received residual data.

According to another example, a computer-readable storage medium storing instructions that when executed cause one or more processors of a device for coding video data to determine that a current block of video data is coded using a linear model prediction mode, wherein the linear model prediction mode is used to predict a chroma component of the current block, wherein the current block comprises a luma component and at least one chroma component including the chroma component predicted using the linear model prediction mode; for the luma component of the current block, determine reconstructed luma samples; based on luma samples in a luma component of one or more already decoded neighboring blocks and chroma samples in a chroma component of the one or more already decoded neighboring blocks, determine values for linear parameters, wherein the luma samples in the luma component of the one or more already decoded neighboring blocks comprise luma samples from a starting line in the luma component of the one or more already decoded neighboring blocks, wherein the starting line in the luma component of the one or more already decoded neighboring blocks is at least one line removed from a border line of the luma component of the current block; based on the linear parameters and the reconstructed luma samples, generate prediction chroma samples for the chroma component of the current block; and reconstruct the chroma component of the current block based on the generated prediction chroma samples and received residual data.

In another example, a device for decoding video data means for determining that a current block of video data is coded using a linear model prediction mode, wherein the linear model prediction mode is used to predict a chroma component of the current block, wherein the current block comprises a luma component and at least one chroma component including the chroma component predicted using the linear model prediction mode; means for determining reconstructed luma samples for the luma component of the current block; based on luma samples in a luma component of one or more already decoded neighboring blocks and chroma samples in a chroma component of the one or more already decoded neighboring blocks, determining values for linear parameters, wherein the luma samples in the luma component of the one or more already decoded neighboring blocks comprise luma samples from a starting line in the luma component of the one or more already decoded neighboring blocks, wherein the starting line in the luma component of the one or more already decoded neighboring blocks is at least one line removed from a border line of the luma component of the current block; means for generating prediction chroma samples for the chroma component of the current block based on the linear parameters and the reconstructed luma samples; and means for reconstructing the chroma component of the current block based on the generated prediction chroma samples and received residual data.

The details of one or more examples of the disclosure are set forth in the accompanying drawings and the description below. Other features, objects, and advantages will be apparent from the description, drawings, and claims.

DETAILED DESCRIPTION

Figure 1:
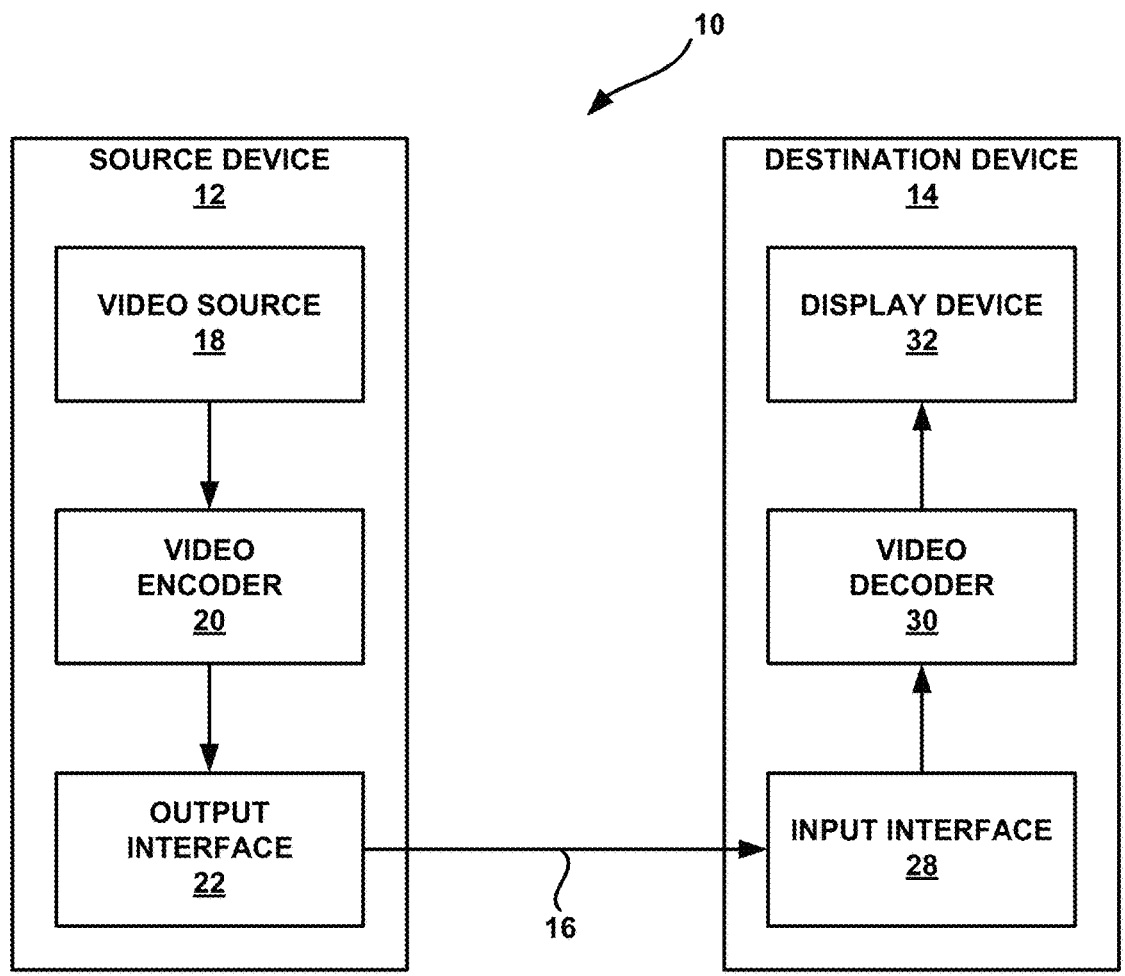
FIG. 1 is a block diagram illustrating an example video coding system that may utilize the techniques described in this disclosure.

This disclosure describes techniques for video coding and compression. In particular, this disclosure describes techniques for a linear-model (LM) prediction video coding mode, also referred to in this disclosure simply as LM mode. In LM mode, a chroma block may be predicted from a corresponding reconstructed luma block, which may be scaled in some examples. If the chroma component is downsampled, such as video data that with a 4:2:2 or 4:2:0 chroma subsampling format, then the chroma block may be predicted from a scaled, downsampled, reconstructed corresponding luma block.

As will be described in more detail below, when coding a block of video data in LM mode, a video coder may derive linear modeling parameters (also referred to as LM parameters, linear parameters, or scaling parameters) based on lines of samples in an already coded block of video data. The video coder may, for example, derive the LM parameters by determining values for the LM parameters that minimize a regression error between the luma samples and the chroma samples for the lines of samples in the already coded block of video data. The lines of samples may, for example, be neighboring samples of the current chroma block and neighboring samples of the corresponding luma block of the current chroma block. For a block currently being coded, luma samples may be coded using, for example, intra prediction or another coding technique. Using reconstructed luma samples for the block currently being coded and the derived LM parameters, the video coder can predict chroma samples for the block currently being coded.

In existing implementations of LM mode, for both the luma component and the chroma component of the already coded block, the lines of samples used for deriving the LM parameters are the column or row of samples in the already coded block of video data that are the closest to, i.e., that are immediately adjacent to, the block currently being coded. This disclosure describes techniques for deriving LM parameters using lines of samples in the already coded block other than lines that are immediately adjacent to the block currently being coded. Utilizing the techniques of this disclosure, a video coder may determine values for LM parameters using a line of luma samples in an already coded block that is at least one line removed from a border line (e.g., top line, bottom line, right most line, or left most line) of the luma component of the current block. Similarly, utilizing the techniques of this disclosure, a video coder may determine values for LM parameters using a line of chroma samples in an already coded block that is at least one line removed from a border line of the chroma component of the current block.

This disclosure describes techniques for determining coding scenarios in which it may be beneficial to derive LM parameters using lines of samples that are at least one line removed from a border line of a block currently being coded. This disclosure also describes techniques for signaling from an encoded to a decoder, either explicitly or implicitly, when to derive LM parameters using lines of samples that are at least one line removed from a border line of a block currently being coded, and/or which line or lines of samples in the already coded neighboring block to use to derive the LM parameters. As will be explained in greater detail below, deriving LM parameters using lines of samples that are at least one line removed from a border line of a block currently being coded may improve overall coding quality by leading to more accurate chroma predictive blocks (e.g., chroma prediction samples).

Various techniques in this disclosure may be described with reference to a video coder, which is intended to be a generic term that can refer to either a video encoder or a video decoder. Unless explicitly stated otherwise, it should not be assumed that techniques described with respect to a video encoder or a video decoder cannot be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure with respect to a video decoder may also be performed by a video encoder, and vice versa.

This disclosure may also use terms such as current layer, current block, current picture, current slice, etc. In the context of this disclosure, the term current is intended to identify a block, picture, slice, etc. that is currently being coded, as opposed to, for example, previously or already coded blocks, pictures, and slices or yet to be coded blocks, pictures, and slices.

FIG. 1 is a block diagram illustrating an example video coding system 10 that may utilize the techniques of this disclosure. Video encoder 20 and video decoder 30 of video coding system 10 represent examples of devices that may be configured to perform techniques for LM mode in accordance with various examples described in this disclosure. As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like. Source device 12 may also be any sort of wireless communication device configured to transmit encoded video data in a signal modulated according to a wireless communication standard, such a WiFi Standard, a Long Term Evolution (LTE) standard, or any other such telecommunications standard.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate a signal including the encoded video data according to a communication standard, such as a wireless communication protocol, and may transmit the modulated signal to destination device 14. Destination device 14 may receive the modulated signal and demodulate the modulated signal according to the same communication standard used by source device 12.

The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In some examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device (e.g., a video camera), a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as if source device 12 stores an encoded bitstream to a computer-readable storage medium, and destination device 14 retrieves the stored encoded bitstream at a later time.

In some examples, video encoder 20 and video decoder 30 operate according to a video compression standard. Examples video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a new video coding standard, namely High Efficiency Video Coding (HEVC), has recently been developed by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD hereinafter, is available from http://phenix.int-evry.fr/jct/doc_end_user/documents/14_Vienna/wg11/JCTVC-N1003-v1. zip. The specification of HEVC and its extensions including Format Range (RExt), Scalability (SHVC), and Multi-View (MV-HEVC) Extensions is available from http://phenix.int-evey.fr/jct/doc_end user/documents/18_Sapporo/wg11/JCTVC-R1013-v6.zip, which is incorporated herein by reference.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. And the latest version of reference software, i.e., Joint Exploration Model 2 (JEM 2) could be downloaded from: https://jvet.hhi.fraunhofer.de/svn/svn_HMJEMSoftware/tags/HM-16.6-JEM-2.0/. In some examples, this algorithm description for JEM2 could be referred to by J. Chen, E. Alshina, G. J. Sullivan, J.-R. Ohm, J. Boyce "Algorithm description of Joint Exploration Test Model 2", JVET-B1001, San Diego, March 2016.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions.

Figure 2:
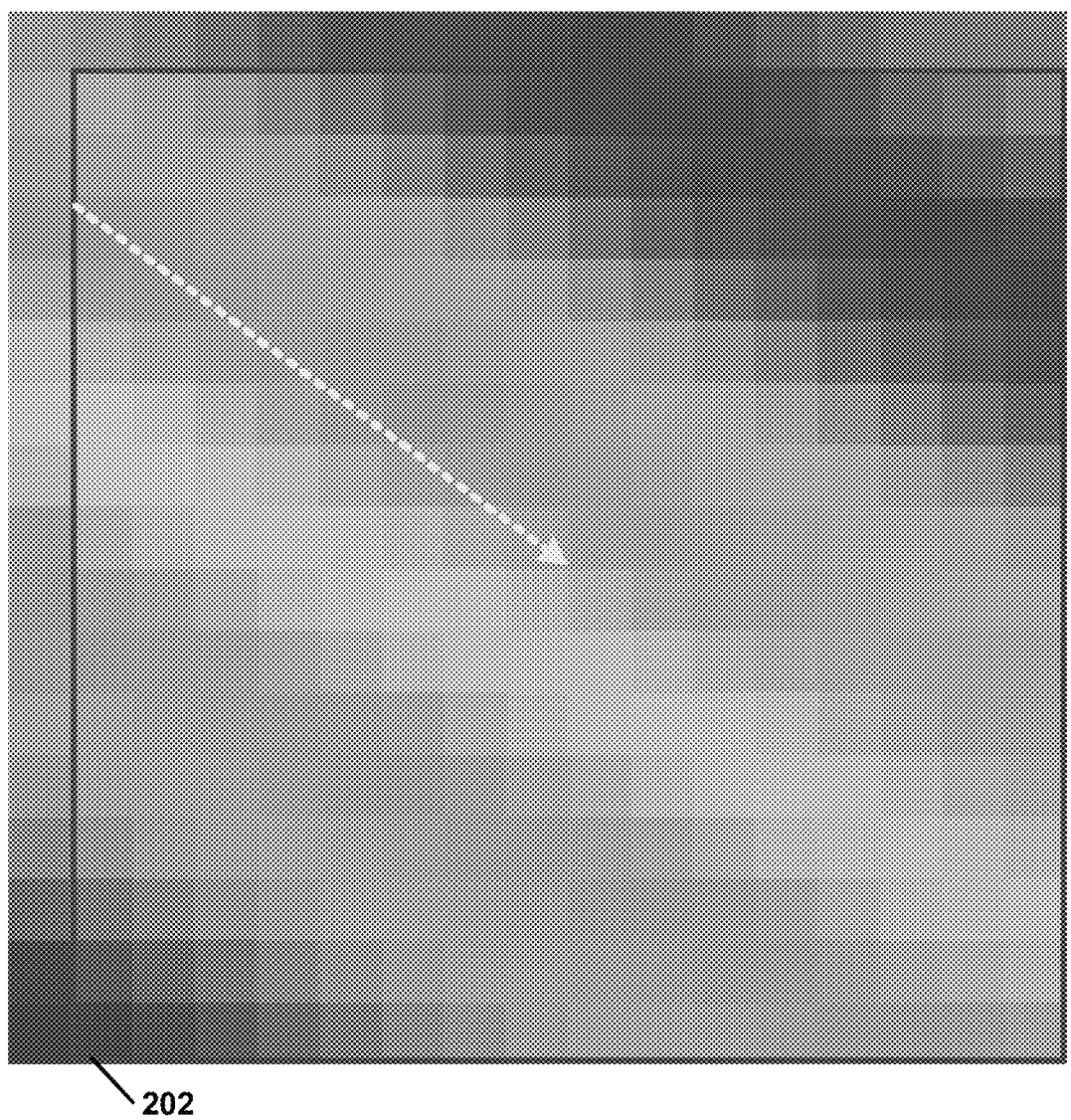
FIG. 2 is a conceptual diagram illustrating an exemplary intra prediction for a 16×16 block.

Video encoder 20 and video decoder 30 may perform intra prediction, i.e., perform image block prediction using reconstructed image samples from a spatially neighboring block. In this context, a spatially neighboring block refers to a block that is adjacent to a block currently being coded, such as a block immediately to the left of the block currently being coded or a block immediately above the block currently being coded. FIG. 2 shows an example of intra prediction for a 16×16 block. In the example of FIG. 2, the 16×16 block (in square 202) is predicted from the above, left and above-left neighboring reconstructed samples (reference samples) located in the above row and left column along a selected prediction direction (as indicated by the arrow).

Figure 3:
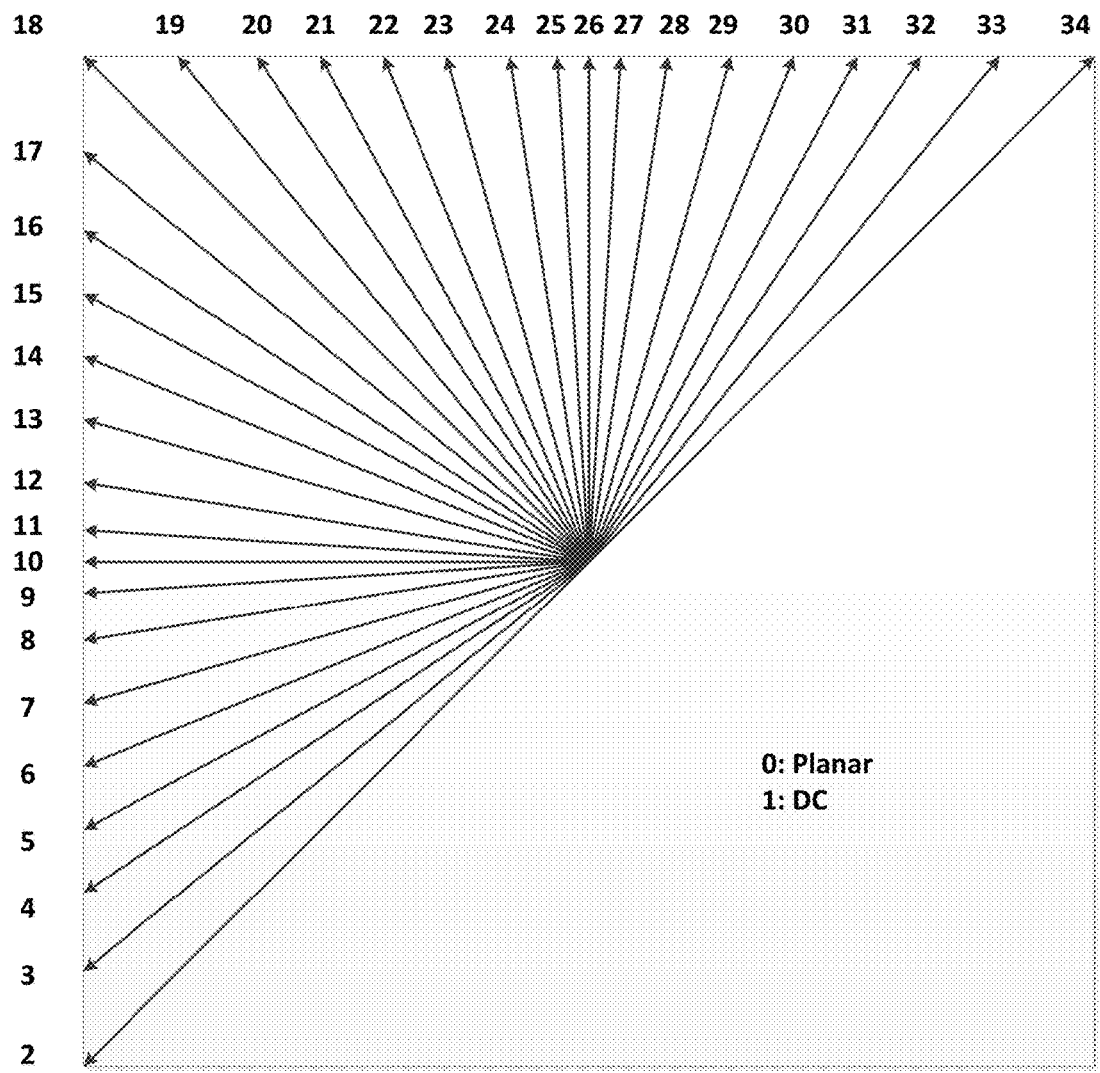
FIG. 3 is a conceptual diagram illustrating exemplary intra prediction modes.

FIG. 3 shows the 35 intra prediction modes for luma blocks utilized in HEVC, including planar mode, DC mode, and 33 angular modes. It is contemplated that successor standards to HEVC may utilize more than 35 intra prediction modes, including a greater number of angular modes. The 35 intra prediction modes defined in HEVC may be indexed as shown in Table 1.

TABLE 1

Specification of intra prediction mode and associated names

| Intra prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

Figure 4:
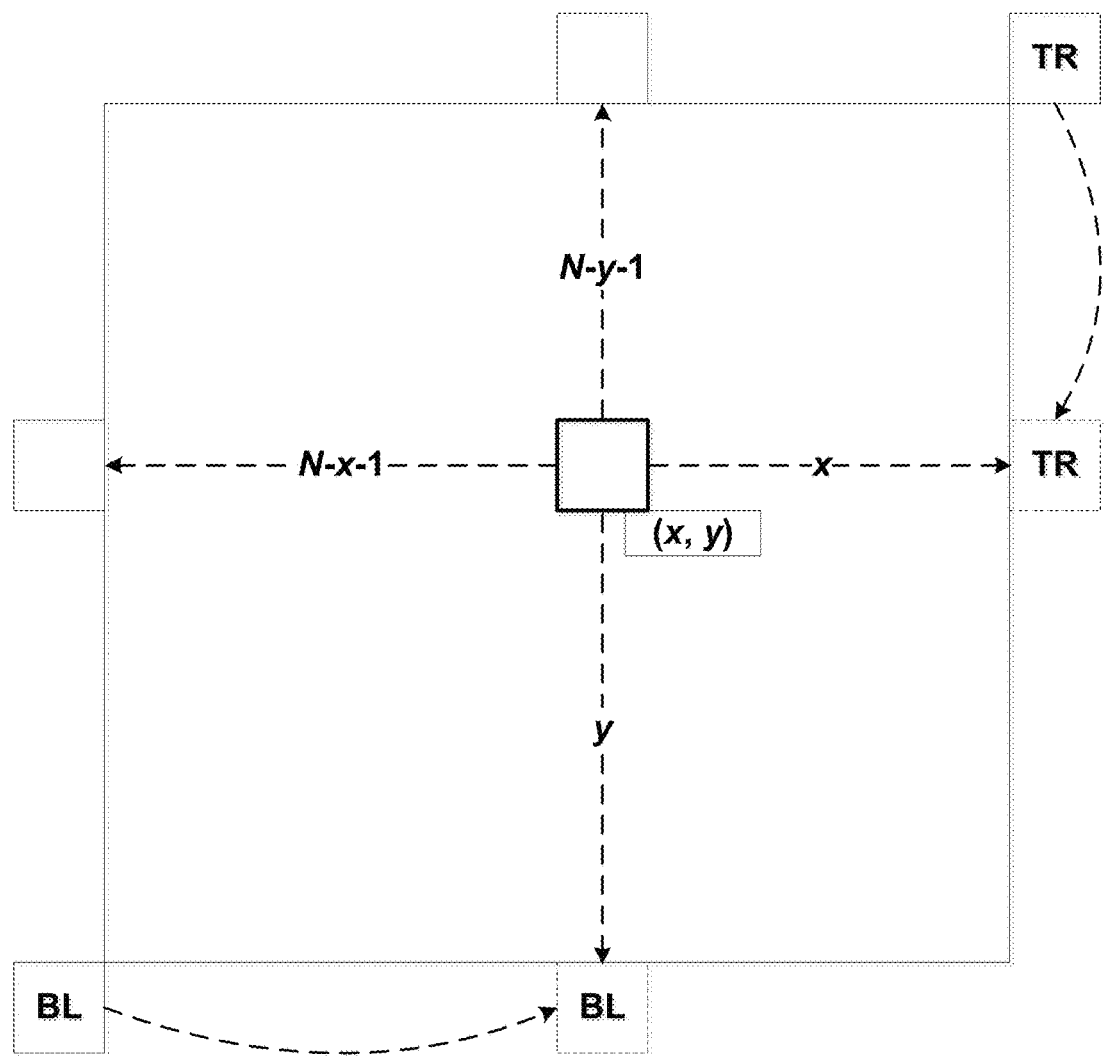
FIG. 4 is a conceptual diagram illustrating an exemplary planar mode.

FIG. 4 shows an example of how to generate a prediction sample using planar mode, which for some types of video coded using HEVC, may be a frequently used intra prediction mode. To perform planar prediction for an N×N block, for each sample $p_{xy}$ located at (x, y), the prediction value may be calculated using four specific neighboring reconstructed samples, e.g., reference samples, with a bilinear filter. The four reference samples may include the top-right reconstructed sample TR, the bottom-left reconstructed sample BL, the two reconstructed samples located at the same column $T(r_{x,-1})$ and row $L(r_{-1,y})$ of the current sample. A sample values in the planar mode may be determined as follows:

$$p_{xy}=(N-y-1) \cdot L+(N-y-1) \cdot T+x \cdot TR+y \cdot BL \quad (1)$$

For DC mode, the prediction block may be simply filled with the average value of the neighboring reconstructed samples. Generally, both planar and DC modes are applied for modeling smoothly varying and constant image regions.

For angular Intra prediction modes in HEVC, which may include totally 33 different prediction directions, the Intra prediction process may be described as follows. For each given angular Intra prediction, the Intra prediction direction may be identified accordingly, for example, according to FIG. 3. As shown, intra mode 18 may correspond to a pure horizontal prediction direction, and intra mode 26 may correspond to a pure vertical prediction direction.

Figure 5:
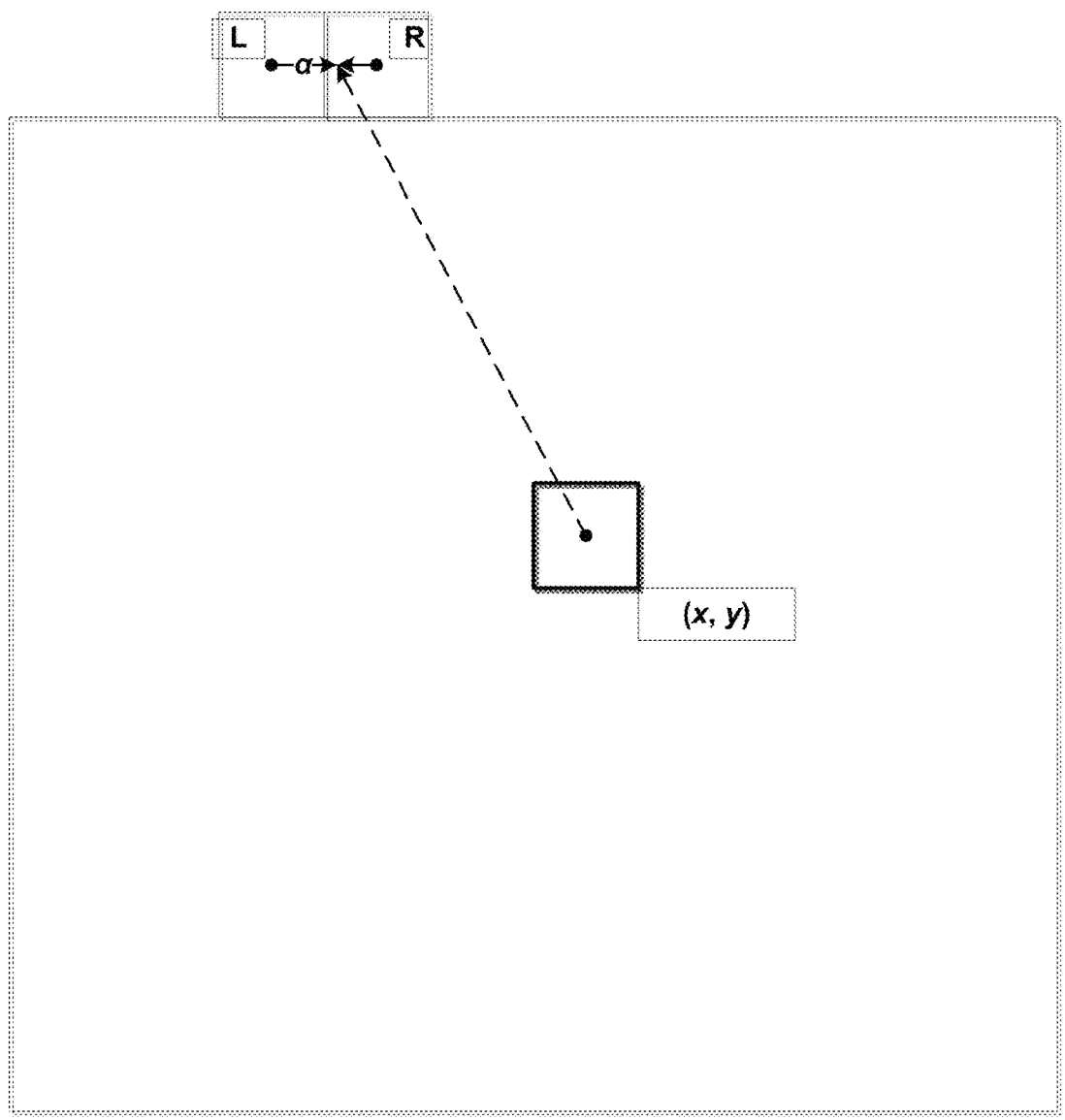
FIG. 5 is a conceptual diagram illustrating an exemplary angular mode.

FIG. 5 shows an example of intra prediction utilizing an angular intra prediction mode. Given a specific intra prediction direction, for each sample of the prediction block, coordinates (x, y) may be first projected to the row/column of neighboring reconstructed samples along the prediction direction, as shown in an example in FIG. 5. Suppose, (x,y) is projected to the fractional position a between two neighboring reconstructed samples L and R, then the prediction value for (x, y) may be calculated using a two-tap bi-linear interpolation filter, formulated as follows:

$$p_{xy}=(1-\alpha) \cdot L+\alpha \cdot R \quad (2)$$

To avoid floating point operations, in HEVC, the above calculation may be approximated using integer arithmetic as follows:

$$p_{xy}=((32-\alpha) \cdot L+a \cdot R+16)>>5, \text{ where } a \text{ is a integer equal to } 32*\alpha \quad (3)$$

Video coding may be performed based on color space and color format. For example, color video plays an essential role in multimedia systems, where various color spaces are used to efficiently represent color. A color space specifies color with numerical values using multiple components. A popular color space is the RGB color space, where color is represented as a combination of three primary color component values (i.e., red, green and blue). For color video compression, the YCbCr color space has been widely used, as described in A. Ford and A. Roberts, "Colour space conversions," University of Westminster, London, Tech. Rep., August 1998, which is incorporated herein by reference.

YCbCr can be converted from RGB color space via a linear transformation and the redundancy between different components, namely the cross component redundancy, is significantly reduced in the YCbCr color space. One advantage of YCbCr is the backward compatibility with black and white TV as Y signal conveys the luminance information. In addition, chrominance bandwidth can be reduced by subsampling the Cb and Cr components in 4:2:0 chroma sampling format with significantly less subjective impact than subsampling in RGB. Because of these advantages, YCbCr has been the major color space in video compression. There is also other color space, such as YCoCg, used in video compression. In this disclosure, regardless of the actual color space used, the Y, Cb, Cr is used to represent the three color components in the video compression scheme.

Figure 6:
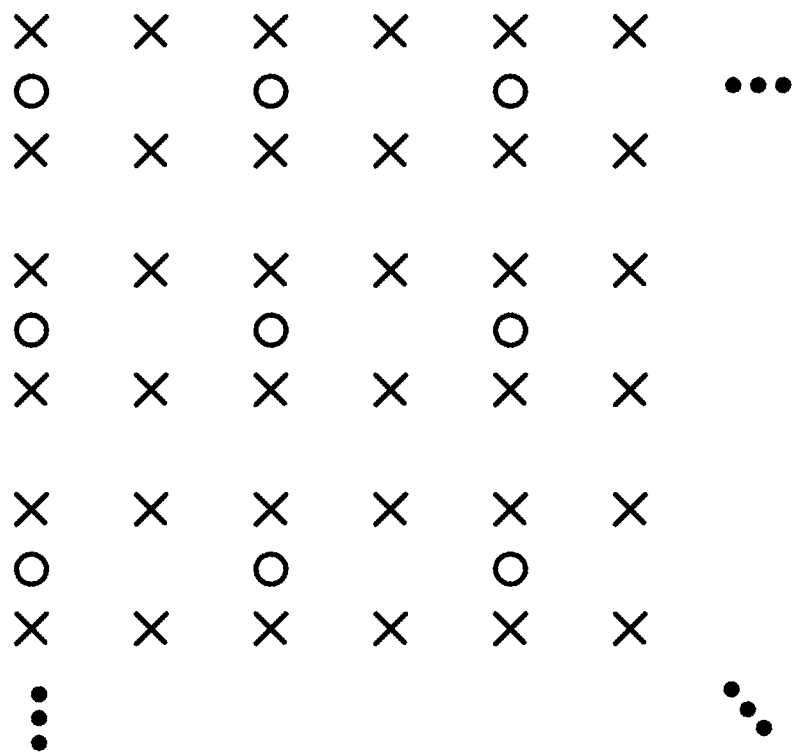
FIG. 6 is a conceptual diagram illustrating exemplary nominal vertical and horizontal relative locations of luma and chroma samples.

FIG. 6 is a conceptual diagram illustrating exemplary nominal vertical and horizontal relative locations of luma and chroma samples. In 4:2:0 sampling, each of the two chroma arrays may have half the height and half the width of the luma array. The nominal vertical and horizontal relative locations of luma and chroma samples in pictures are shown in FIG. 6.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU. While HEVC allows a CU to include multiple PUs, some video coding standards may utilize a one-to-one relationship between CUs and PUs, such that each CU includes only one PU.

Video encoder 20 may use intra prediction, inter prediction, or linear model (LM)-prediction, as a few examples, to generate (e.g., determine) the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate (e.g., determine) the predictive blocks of a PU, video encoder 20 may generate the predictive blocks, which include prediction samples, of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU' s original luma coding block. In addition, video encoder 20 may generate a Cb residual block for the CU. Each sample in the CU's Cb residual block may indicate a difference between a Cb sample in one of the CU' s predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

For a chroma block, rather than determining a predictive block for intra- or inter-prediction, video encoder 20 may determine a predictive block based on a reconstructed, corresponding luma block, for LM mode. Video decoder 30 may similarly determine a predictive block based on a reconstructed corresponding luma block. The corresponding luma block refers to the luma block that was part of the unit (e.g., coding unit or prediction unit) from which the current chroma block was determined. Video encoder 20 may determine the residual between the chroma block and this predictive block generated from a reconstructed corresponding luma block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include an encoded representation of video data. For instance, the bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RB SP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RB SP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive blocks for the PUs of a current CU. As another example, for LM mode, video decoder 30 may determine the predictive block for a chroma block based on reconstructed samples of a corresponding luma block. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU.

Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to coded blocks of video data using LM mode. The following is a description of LM mode. Although the cross complement redundancy is significantly reduced in YCbCr color space, correlation between three color components still exists. Various methods have been studied to improve the video coding performance by further reducing the correlation.

With respect to 4:2:0 chroma video coding, the LM mode was well studied during development of HEVC standard. See e.g., J. Chen, V. Seregin, W.-J. Han, J.-S. Kim, B.-M. Joen, "CE6.a.4: Chroma intra prediction by reconstructed luma samples", Joint Collaborative Team on Video Coding (JCT-VC) of ITU-T SG16 WP3 and ISO/IEC JTC1/SC29/WG11, JCTVC-E266, 5th Meeting: Geneva, 16-23 Mar. 2011, available from http://phenix.int-evry.fr/jct/doc_end_user/current_document.php?id=2196, and referred as JCTVC-E266 hereafter.

With LM mode, the chroma samples are predicted based on reconstructed luma samples of the same block by using a linear model as follows:

$$\text{pred}_C(i,j) = \alpha \cdot \text{rec}_L(i,j) + \beta \quad (4)$$

where $\text{pred}_C(i,j)$ represents the prediction of chroma samples in a block and $\text{rec}_L(i,j)$ represents the downsampled reconstructed luma samples of the same block. Parameters $\alpha$ and $\beta$ (the LM parameters) are derived from causal reconstructed samples around the current block. Denote the chroma block size by N×N, then both i and j are within the range [0, N).

Parameters $\alpha$ and $\beta$ in equation (4) may be derived by minimizing regression error between the neighboring reconstructed luma and chroma samples around the current block.

$$E(\alpha, \beta) = \sum_i (y_i - (\alpha \cdot x_i + \beta))^2 \quad (5)$$

And the LM parameters $\alpha$ and $\beta$ are solved as follows $$\alpha = \frac{I \sum x_i \cdot y_i - \sum x_i \cdot \sum y_i}{I \sum x_i \cdot x_i - \sum x_i \cdot \sum x_i} \quad (6)$$

$$\beta = \left( \sum y_i - \alpha \cdot \sum x_i \right) / I \quad (7)$$

where $x_i$ is downsampled reconstructed Luma reference sample, $y_i$ is reconstructed Chroma reference samples, and I is amount of the reference samples. For a target N×N chroma block, when both left and above causal samples are available, total involved samples number I is equal to 2N; when only left or above causal samples are available, total involved samples number I is equal to N.

Figure 7:
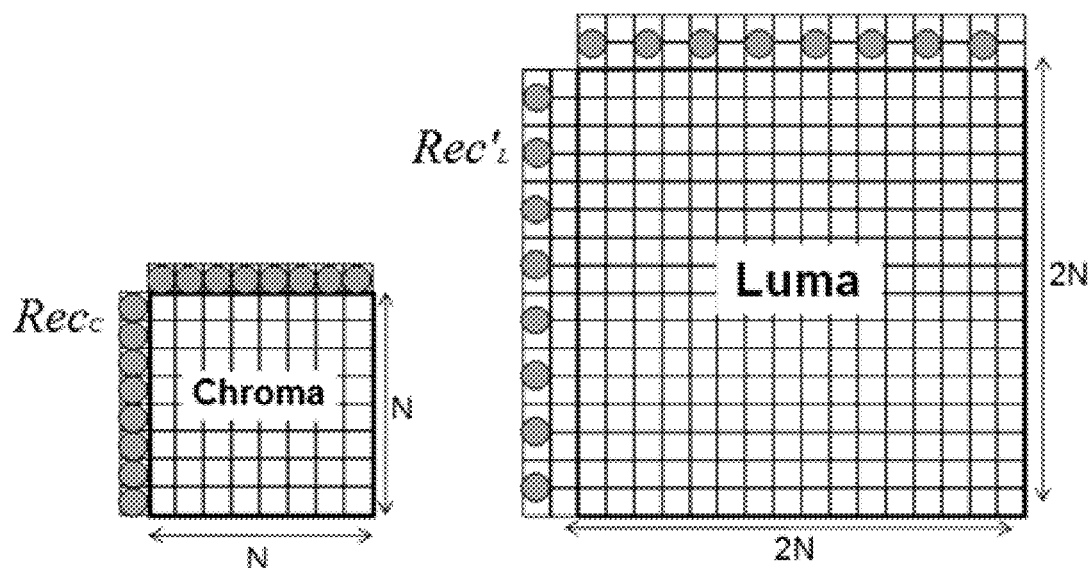
FIG. 7 is a conceptual diagram illustrating examplary locations from which scaling parameters used to scale the downsampled, reconstructed luma block are derived.

FIG. 7 is a conceptual diagram illustrating example locations from which scaling parameters used to scale the downsampled, reconstructed luma block are derived. For example, FIG. 7 illustrates an example of 4:2:0 sampling, and the scaling parameters are $\alpha$ and $\beta$.

In general, when LM mode is applied, video encoder 20 and video decoder 30 may invoke the following steps. Video encoder 20 and video decoder 30 may downsample the neighboring luma samples. Video encoder 20 and video decoder 30 may derive the LM parameters (i.e., $\alpha$ and $\beta$) (also referred to as scaling parameters). Video encoder 20 and video decoder 30 may downsample the current luma block and derive the prediction (e.g., predictive block) from the downsampled luma block and LM parameters (i.e., scaling parameters).

There may be various ways in which to downsample. The following describes example ways in which downsampling may be performed.

In JCTVC-E266, as described above, when performing LM mode, the downsampled current luma block and downsampled neighboring luma block are required. The downsampled current luma block is used to derive the prediction block for chroma coding while the downsampled neighboring luma block is used for LM parameters (i.e., $\alpha$ and $\beta$) derivation.

Since the typical sampling ratio of chroma components is half of that of luma component and has 0.5 sample phase difference in vertical direction in 4:2:0 sampling, reconstructed luma of current block is downsampled in vertical direction and subsample in horizontal direction to match size and phase of chroma signal, as follows:

$$\text{rec}_L(i, j) = (\text{Rec}_{LOrig}[2i, 2j] + \text{Rec}_{LOrig}[2i, 2j+1]) \gg 1 \quad (8)$$

wherein $\text{Rec}_{LOrig}[\ ]$ indicates the original reconstructed luma sample.

Figure 8:
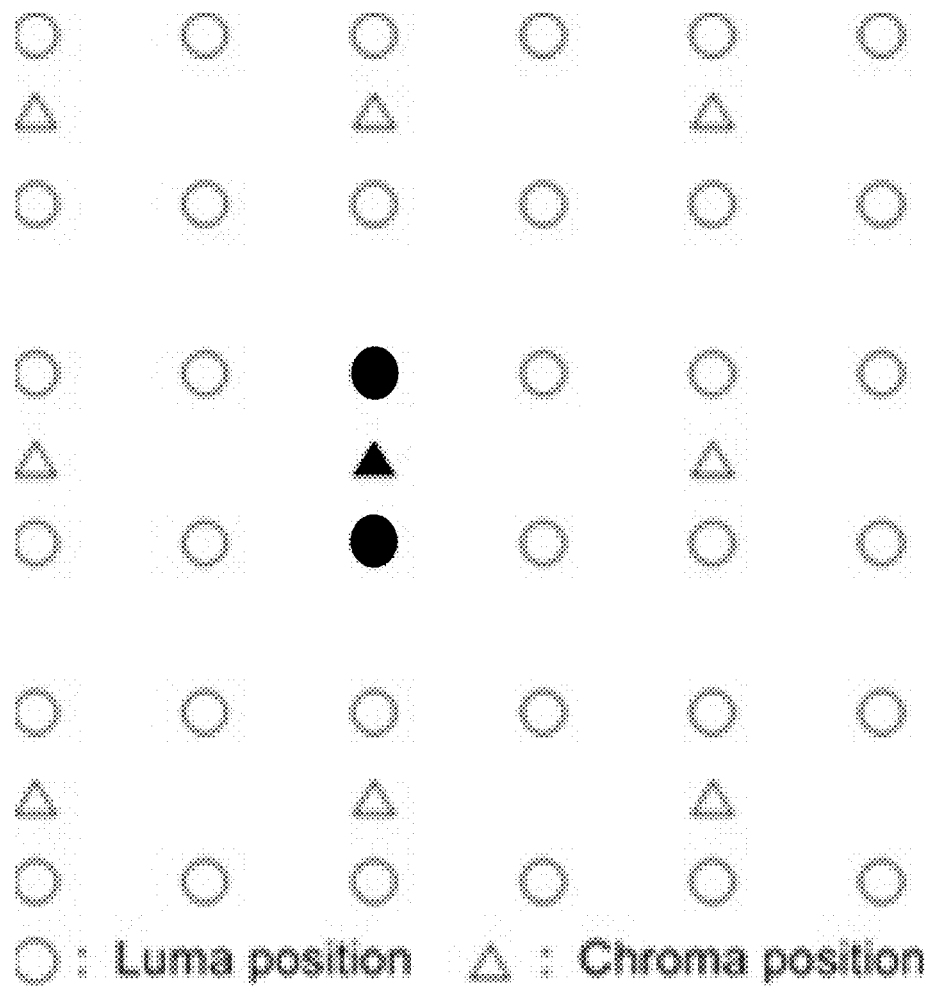
FIG. 8 is a conceptual diagram illustrating an example of luma positions and chroma positions for downsampling samples of a luma block for generating a predictive block.

FIG. 8 is a conceptual diagram illustrating an example of luma positions and chroma positions for downsampling samples of a luma block for generating a predictive block. As depicted in FIG. 8, a chroma sample, represented by the filled-in triangle, is predicted from two luma samples, represented by the two filled-in circles, by applying [1, 1] filter. The [1, 1] filter is one example of a 2-tap filter.

For the downsampling of neighboring luma block, when the neighboring samples are on top of the current luma block, the downsampling process is defined as:

$$\text{rec}_L(i, -1) = \text{Rec}_{LOrig}[2i, -1] \quad (9)$$

When the neighboring samples are on the left of the current luma block, the downsampling process is defined as:

$$\text{rec}_L(-1, j) = (\text{Rec}_{LOrig}[-2, 2j] + \text{Rec}_{LOrig}[-2, 2j+1]) \gg 1 \quad (10)$$

The 2-tap filter, i.e., [1, 1], may be the same as what has been used in the example illustrated in FIG. 8.

Other downsampling techniques have also been proposed. In Yi-Jen Chiu, Yu Han, Lidong Xu, Wenhao Zhang, Hong Jiang, "Cross-channel techniques to improve intra chroma prediction", Joint Collaborative Team on Video Coding (JCT-VC) of ITU-T SG16 WP3 and ISO/IEC JTC1/SC29WG/11, JCTVC-F502, 6th Meeting: Torino, IT, 14-22 Jul. 2011, available from http://phenix.int-evey.fr/jct/doc_end_user/current_document.php?id=2979, and referred to as JCTVC-F502, instead of using the two-tap filter, the 2-dimensional 6-tap filtering is applied to both current luma block and the neighboring luma block. The 2-dimensional filter coefficient set is:

$$\begin{bmatrix} 1 & 2 & 1 \\ 1 & 2 & 1 \end{bmatrix} \bigg/ 8 \qquad (11)$$

In other words, the downsampled luma samples are derived by equation (12):

$$rec_L(i, j) = (Rec_{LOrig}[2i, 2j]*2 + Rec_{LOrig}[2i, 2j+1] + Rec_{LOrig}[2i, 2j-1] + Rec_{LOrig}[2i+1, 2j]*2 + Rec_{LOrig}[2i+1, 2j+1] + Rec_{LOrig}[2i+1, 2j+1]) >> 3 \qquad (12)$$

Figure 9:
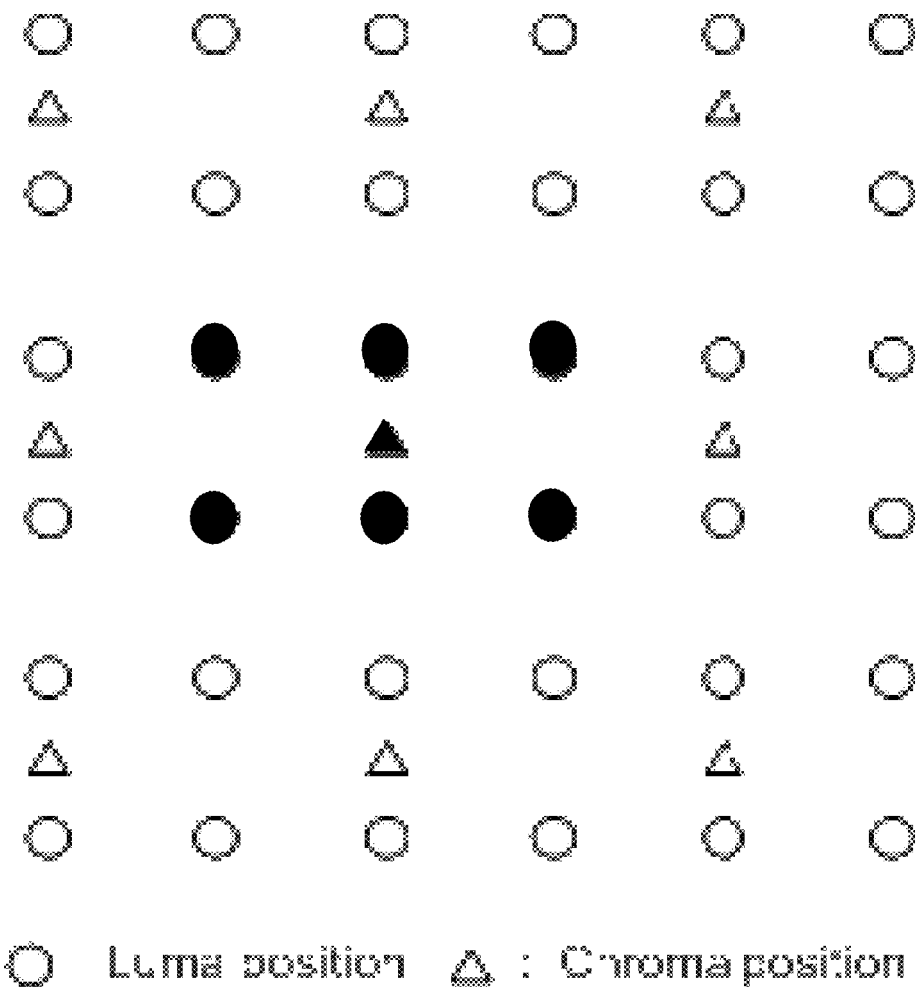
FIG. 9 is a conceptual diagram illustrating another example of luma positions and chroma positions for downsampling samples of a luma block for generating a predictive block.

FIG. 9 is a conceptual diagram illustrating another example of luma positions and chroma positions for downsampling samples of a luma block for generating a predictive block. As depicted in FIG. 9, a chroma sample, represented by the filled in triangle, is predicted from six luma samples, represented by the six filled in circles, by applying a 6-tap filter.

Since the predictor of one chroma sample is derived using the linear function, as defined in formula (4), it could be seen that when 6-tap filter is applied, the predictor of one chroma sample relies on the six neighboring luma samples. When combining equations (4) and (12), the result is the following equation (13):

$$pred_C(i, j) = \qquad (13)$$
$$\alpha \cdot (Rec_{LOrig}[2i, 2j]*2 + Rec_{LOrig}[2i, 2j+1] + Rec_{LOrig}[2i, 2j-1] + Rec_{LOrig}[2i+1, 2j]*2 + Rec_{LOrig}[2i+1, 2j+1] + Rec_{LOrig}[2i+1, 2j-1]) >> 3) + \beta$$

In the following text, the downsampled sample $rec_L$ (i, j) is named as the corresponding downsampled luma sample for the chroma sample located at (i, j).

Some recent progress in JEM 2.0 includes intra mode coding with six most probable modes and more total intra prediction modes. For example, the 33 angular modes in HEVC has been expanded to 65 angular modes. Such changes may be suitable for use with one or more processes described herein.

Some examples may use a four-tap intra interpolation filter. Four-tap intra interpolation filters may be utilized to improve the directional intra prediction accuracy. In HEVC, a two-tap linear interpolation filter may be used to generate the intra prediction block in the directional prediction modes (i.e., excluding Planar and DC predictors). In some examples, two types of four-tap interpolation filters may be used: Cubic interpolation filters for 4×4 and 8×8 blocks, and Gaussian interpolation filters for 16×16 and larger blocks. The parameters of the filters may be fixed according to block size, and the same filter may be used for all predicted pixels, in all directional modes.

Some examples may use a boundary prediction filter. In HEVC, after the Intra prediction block has been generated for VER and HOR intra modes, the left-most column and top-most row of the prediction samples may be further adjusted, respectively. In some examples, as described further by in J. An, Y.-W. Chen, K. Zhang, H. Huang, Y.-W. Huang, and S. Lei., "Block partitioning structure for next generation video coding", International Telecommunication Union, COM16-C966, September 2015, this method has been further extended to several diagonal intra modes, and boundary samples up to four columns or rows are further adjusted using a two-tap (for intra mode 2 & 34) or a three-tap filter (for intra mode 3-6 & 30-33).

Figure 10:
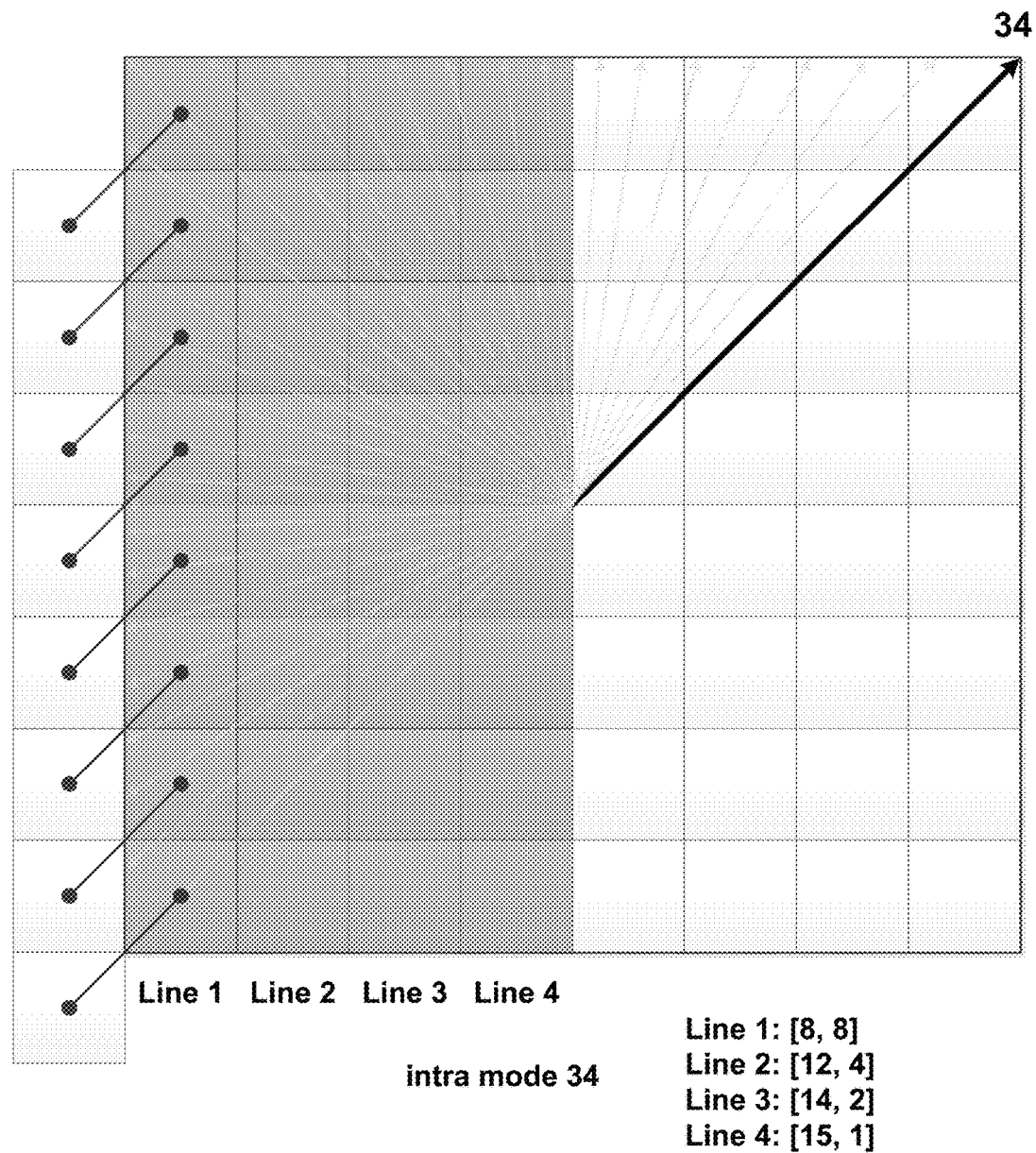
FIG. 10 is a conceptual diagram illustrating an example boundary prediction filter for intra mode 34.
Figure 11:
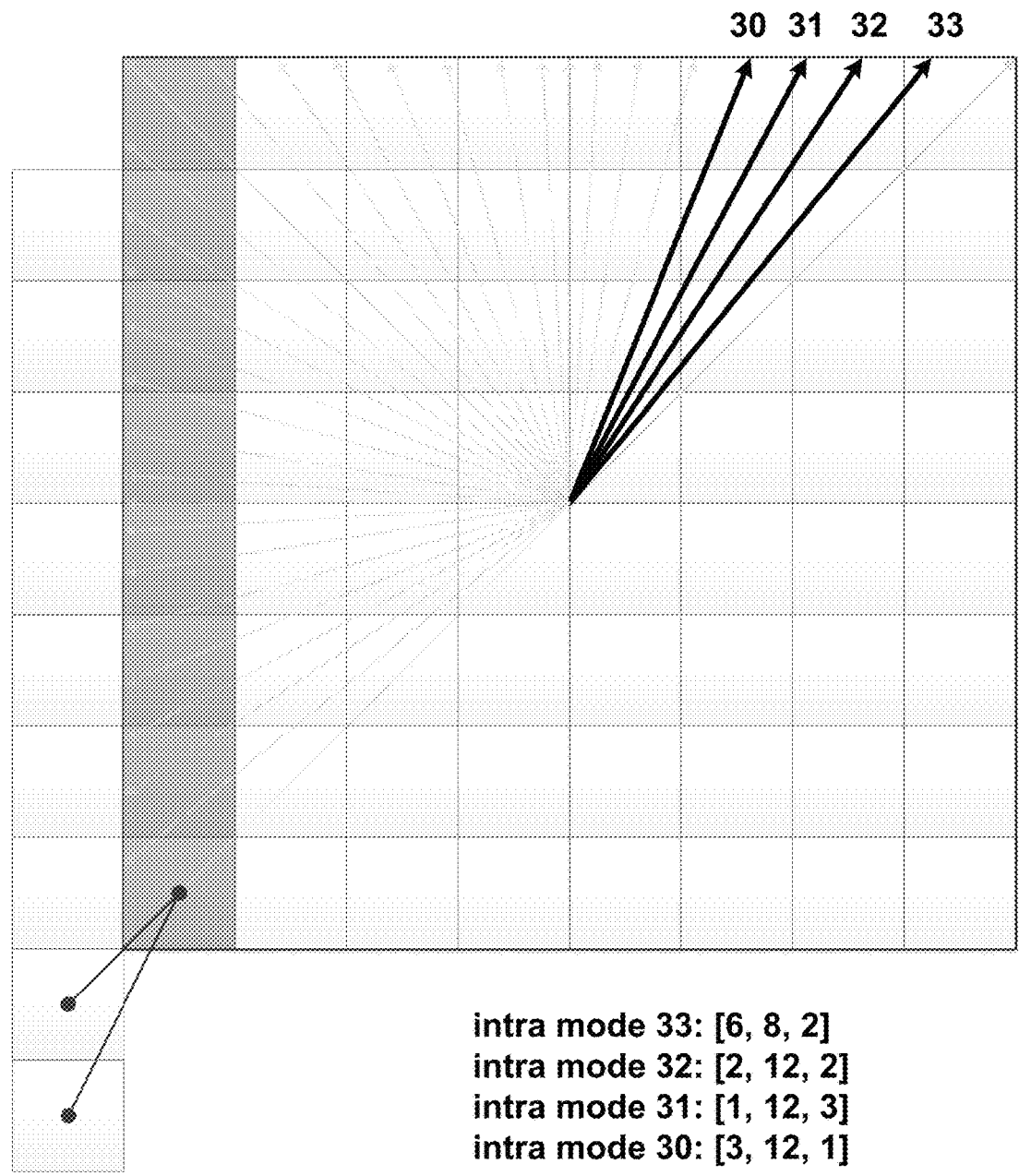
FIG. 11 is a conceptual diagram illustrating example boundary prediction filters for intra modes 30-33.

FIGS. 10 and 11 shows examples of the boundary prediction filters for intra modes 34 and 30~33. Examples of boundary prediction filters for intra mode 30-34., and the boundary prediction filters for intra mode 2 and 3-6 are similar.

In the 3rd JVET meeting, two proposals, i.e., JVET-C0071 and JVET-C0043 describe a method of adaptively changing the reference lines used for intra prediction. The citation for JVET-C0071 is Li et al. "Multiple line-based intra prediction" May 26, 2016 and available from http://phenix.int-evey.fr/jvet/doc_end_user/current_document.php?id=2669. The citation for JVET-C0043 is Chang et al. "Arbitrary reference tier for intra directional modes" May 25, 2016, and available from http://phenix.int-evey.fr/jvet/doc_end_user/current_document.php?id=2641. The reference line index may be explicitly coded in the bitstream. For each coding unit, the index of reference line (i.e., reference tier in FIG. 12) is signaled. The chroma components may reuse the downsampled reference line index of its corresponding luma component. For 4:2:0 content, chroma components may use reference line 0 when luma component uses reference line 0 or line 1. Chroma components may use reference line 1 when luma component uses reference line 2 and line 3. In JVET-C0043, the described method is only applied to angular intra prediction modes. DC and planar modes still uses the closest row/column. In JVET-C0071, residual compensation may also be introduced to further improve the coding efficiency. Both of the methods described may be applied to all intra prediction modes except LM mode.

Figure 12:
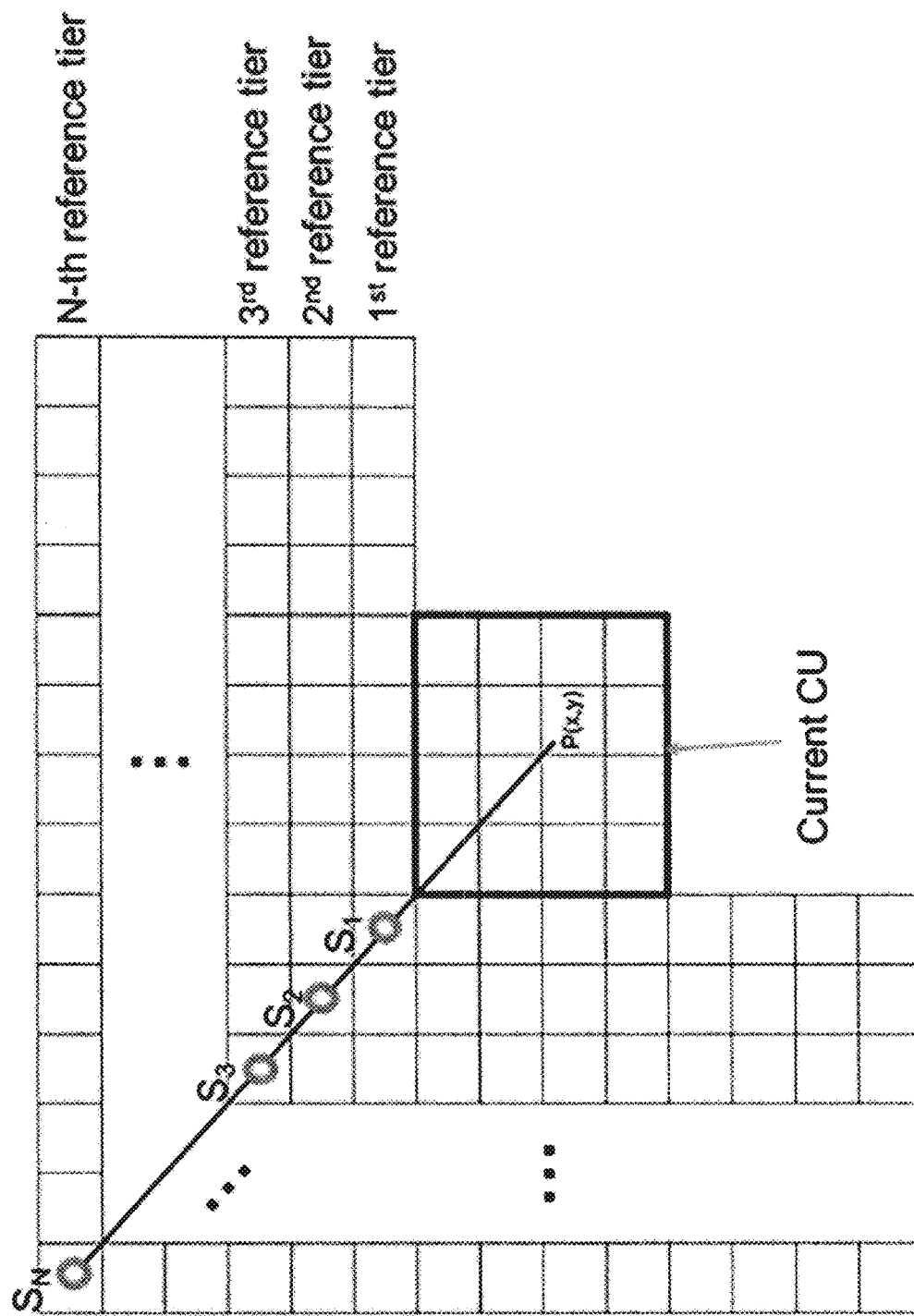
FIG. 12 is a conceptual diagram illustrating example reference lines exploited for proposed intra directional modes.

FIG. 12 is a conceptual diagram illustrating example reference lines exploited for proposed directional intra prediction modes. In the example of FIG. 12, the line labeled $1^{st}$ reference tier represents a line adjacent to a border line of the current CU. In contrast, the lines labeled $2^{nd}$ reference tier, $3^{rd}$ reference tier, and N-th reference tier represent lines that are at least one line removed from a border line of the current block. In the example of FIG. 12, sample P(x,y) may be predicted from any of samples $S_1$ to $S_N$, depending on which reference line is used for the intra prediction.

Moreover, in HEVC, the option to partition a picture into rectangular regions called tiles has been specified. The main purpose of tiles is to increase the capability for parallel processing rather than provide error resilience. Tiles are independently decodable regions of a picture that are encoded with some shared header information. Tiles can additionally be used for the purpose of spatial random access to local regions of video pictures. A typical tile configuration of a picture consists of segmenting the picture into rectangular regions with approximately equal numbers of CTUs in each tile. Tiles provide parallelism at a coarser level of granularity (picture/subpicture), and no sophisticated synchronization of threads is necessary for their use.

Some examples may use cross component prediction. To reduce the cross component redundancy, in LM mode, the chroma samples may be predicted based on reconstructed luma samples of the same block by using a linear model as follows:

$$pred_C(i,j) = \alpha \cdot rec_L(i, j) + \beta \qquad (14)$$

where $pred_C(i,j)$ represents the prediction of chroma samples in a block and $rec_L(i,j)$ represents the downsampled reconstructed luma samples of the same block. LM parameters α and β are derived by minimizing regression error between the neighbouring reconstructed luma and chroma samples around the current block In JEM, the LM mode may be extended to the prediction between two chroma components, i.e. Cr component is predicted from Cb component. Instead of using the reconstructed sample signal, the cross component prediction may be applied in residual domain. This may be implemented by adding a weighted reconstructed Cb residual to the original Cr intra prediction to form the final Cr prediction:

$$\text{pred}_{Cr}^*(i,j) = \text{pred}_{Cr}(i,j) + \alpha \cdot \text{resi}_{Cb}'(i,j) \quad (15)$$

The scaling factor a may be derived as in LM mode. The only difference may be an addition of a regression cost relative to a default a value in the error function so that derived scaling factor is biased towards the default value (−0.5). LM mode may be added as one additional chroma intra prediction mode. At an encoder side, one more RD cost check for chroma component is added for selecting the chroma intra prediction mode.

Some examples may use a quad-tree binary-tree structure (QTBT). In VCEG proposal COM16-C966, as described in J. An, Y.-W. Chen, K. Zhang, H. Huang, Y.-W. Huang, and S. Lei., "Block partitioning structure for next generation video coding", International Telecommunication Union, COM16-C966, September 2015, a quad-tree-binary-tree (QTBT) was described for future video coding standard beyond HEVC. Simulations showed the proposed QTBT structure may be more efficient than quad-tree structure in used HEVC.

In an example QTBT structure, a CTB may be firstly partitioned by quad-tree, where the quad-tree splitting of one node may be iterated until the node reaches the minimum allowed quad-tree leaf node size (MinQTSize). If the quad-tree leaf node size is not larger than the maximum allowed binary tree root node size (MaxBTSize), it can be further partitioned by a binary tree. The binary tree splitting of one node may be iterated until the node reaches the minimum allowed binary tree leaf node size (MinBTSize) or the maximum allowed binary tree depth (MaxBTDepth). The binary tree leaf node is namely CU which will be used for prediction (e.g. intra-picture or inter-picture prediction) and transform without any further partitioning.

In some examples, there may be two splitting types, symmetric horizontal splitting and symmetric vertical splitting, in the binary tree splitting. In one example of an exemplary QTBT partitioning structure, the CTU size may be set as 128×128 (luma samples and two corresponding 64×64 chroma samples), the MinQTSize may be set as 16×16, the MaxBTSize may be set as 64×64, the MinBTSize (for both width and height) may be set as 4, and the MaxBTDepth may be set as 4. The quadtree partitioning may be applied to the CTU first to generate quad-tree leaf nodes. The quad-tree leaf nodes may have a size from 16×16 (i.e., the MinQTSize) to 128×128 (i.e., the CTU size). If the leaf quad-tree node is 128×128, it may not be further split by the binary tree since the size exceeds the MaxBTSize (i.e., 64×64). Otherwise, the leaf quad-tree node may be further partitioned by the binary tree. Therefore, the quad-tree leaf node may be also the root node for the binary tree and has the binary tree depth as 0. When the binary tree depth reaches MaxBTDepth (i.e., 4), it may imply no further splitting. When the binary tree node has width equal to MinBTSize (i.e., 4), it may imply no further horizontal splitting. Similarly, when the binary tree node has height equal to MinBTSize, it may imply no further vertical splitting. The leaf nodes of the binary tree are namely CUs further processed by prediction and transform without any further partitioning.

Figure 13B:
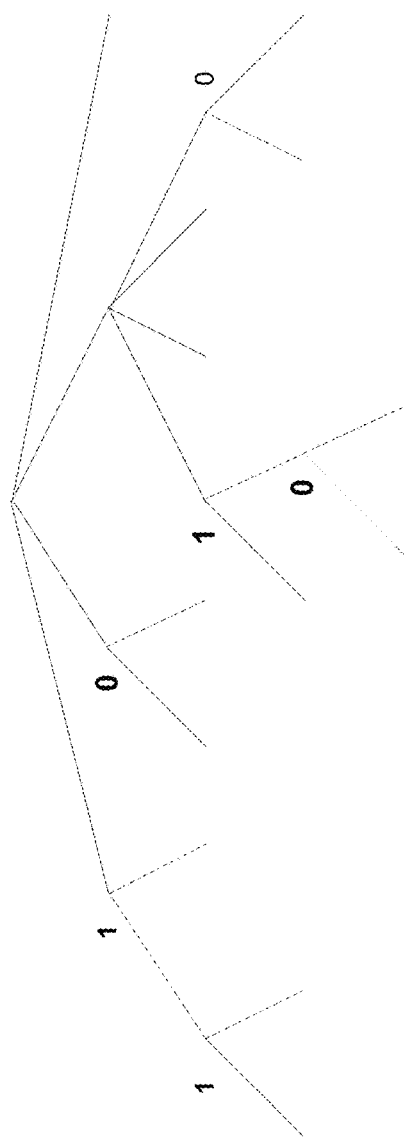
FIG. 13B is a conceptual diagram illustrating an example QTBT structure.
Figure 13A:
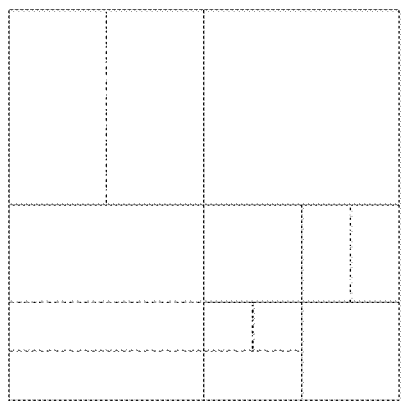
FIG. 13A is a conceptual diagram illustrating an example block partitioning by using a quad-tree-binary-tree (QTBT) structure.

FIG. 13A illustrates an example of block partitioning by using QTBT. FIG. 13B illustrates the corresponding tree structure. The solid lines indicate quad-tree splitting and dotted lines indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For the quad-tree splitting, there is no need to indicate the splitting type since it always split a block horizontally and vertically into 4 sub-blocks with an equal size.

There may exist certain issues/problems with techniques for LM mode. For example, when LM is enabled and a reference line used by luma prediction that is not the closest one (e.g., 2nd/3rd reference line, which indicates higher quality of the reference line compared to the 0th reference line), the 0th reference line (and 1st luma reference line) may still be used in LM parameter derivation. The poor quality of reference lines may decrease the coding efficiency. Additionally, the signaling of reference line index used to locate the reference line for intra prediction may restrict the overall performance. Further, when a different tree structure for luma and chroma components (i.e., tree structure is decoupled) is applied, such as in QTBT design, how to define the reference line index used in chroma coding may be unknown since one chroma CB may correspond to multiple luma CBs and each of the luma CBs may use a different line index. Further, using one reference line may be sub-optimal considering that a different position within one block may prefer different reference lines due to local diversity.

To resolve the problems mentioned above, the disclosure describes the following techniques. The techniques may apply individually, or any combination of them may apply. In general, video encoder 20 and video decoder 30 may perform these example techniques as part of encoding or decoding a chroma block in an LM mode. For ease, the techniques are described with respect to a video coder, examples of which include video encoder 20 and video decoder 30.

Some examples may denote the signaled reference line index by RefIdxSig and may define a maximum number of reference lines by N (N is a positive integer). RefIdx is in the range of [0, N−1], respectively. The real reference line index may be derived from RefIdxSig and may be represented by RefIdx. The closest reference line may be represented with RefIdx equal to 0.

According to techniques of this disclosure, for LM mode, the neighboring luma/chroma row/column used for parameter derivation may be other rows/columns beside the closest row/column. As one example, the reference line index signaled for luma prediction direction may also be inherited with potential changes based on chroma sampling format for LM mode.

In some examples, for 4:2:0 chroma sampling format, the reference line index for chroma component used for LM mode parameter derivation may be set to RefIdx/2. When the two reference lines (i.e., when using 6-tap filter) are used as in JEM, two reference lines of luma component may be involved with indices equal to (RefIdx) and (RefIdx+1). In some examples, a restriction of the utilized reference lines may be added to reduce the increase of line buffers. For example, when the signaled RefIdx is equal to (N−1), it may be treated in the same way as RefIdx equal to (N−2), i.e., the two reference lines with indices equal to (RefIdx) and (RefIdx−1) for luma components, and the reference line with index equal to (Refldx−1)/2 for chroma component may be utilized to derive LM parameters.

In some examples, when the two reference lines (i.e., when using 6-tap filter) are used as in JEM, the two reference lines of luma component may be involved for LM parameter derivation may be derived as: line index of the two reference lines of luma component are equal to (Refldx) and (Refldx+1) when Refldx %2 is equal to 0, and line index of the two reference lines of luma component are equal to (Refldx−1) and (Refldx) when Refldx %2 is equal to 1. The reference line index for chroma component used for LM mode parameter derivation may be set to Refldx/2.

In some examples, when two different reference indices result in the same luma or chroma reference lines used in LM parameter derivation process (e.g., Refldx equal to 0 and 1), the downsampling filters may be different to distinguish the reference line indices. In some examples, the reference lines used in the LM parameter derivation process may be within the same slice/tile as the current luma/chroma blocks.

In some examples, when two different reference lines with indices equal to Refldx and (Refldx+1) are utilized in LM parameter derivation, and the line with index equal to (Refldx+1) is not available, such as out of picture boundary/ in a different slice/in a different tile, in one example, the two reference lines may be modified to those with indices equal to Refldx and (Refldx−1). In another example, the unavailable reference line may be padded to be the same as the available reference line. In some examples, for a 4:4:4 chroma sampling format, the reference line index for chroma component used for LM mode parameter derivation may be set to Refldx. When 6-tap filter is used, two reference lines of luma component may be involved with indices equal to (Refldx) and (Refldx+1).

According to techniques of this disclosure, instead of coding the index of reference lines for intra prediction, the reference line is implicitly coded, i.e., derived based on the information of reference reconstructed samples and/or signaled intra prediction mode, and/or transform matrix.

In some examples, given the intra prediction mode, for each reference line, one or more techniques may derive a prediction block. A function may then be defined to evaluate the reliability of the prediction block. And one of the reference line may be selected based on the function.

In some examples, a function may be defined to evaluate the quality of reference lines. And one of the reference line may be selected based on the function. Alternatively, or additionally, based on the reference lines, samples at different positions within a block may select different reference line.

In some examples, the reference line index may be derived based on the intra prediction mode and the relative position within one block. The principle of the selection could be the crossing of the reference line and the intra prediction direction may be closer to the integer precision. Alternatively, or additionally, in some examples, when multiple reference lines share the same intermedia sub-pixel position, only one of the reference line may be used or multiple lines may be utilized with some weighting function applied.

In some examples, when an implicit coding of reference line indices is utilized, different transform blocks within a coding unit may select different reference line indices.

According to techniques of this disclosure, when the tree structure of luma/chroma components are decoupled (i.e., the luma and chroma trees structures are different), the following methods may be applied for the multiple-lined based intra prediction. The reference line index for Luma and chroma components may be signaled separately. In some examples, one index may be signaled for luma component and one index for two chroma components may be signaled. In another example, one index may be signaled for each color component. In some examples, in some examples, the unit of sharing the same reference index may be different for luma/chroma components. That is, at which level that the signaling of reference index may be dependent on the color component. In some examples, each luma coding block may signal one index while for a chroma component, the index may be signaled at a coding tree block level, i.e., grouped together.

In some examples, only the reference index for the luma component may be signaled. The reference line index for the chroma components may be derived by the reference line index of a representative luma block. In one example, the representative luma block may be defined as the corresponding luma block that covers the center/top-left/bottom-right/ top-right or other position of the chroma block. In one example, the representative luma block may be defined as the corresponding luma block that covers the center position of the center/top-left/bottom-right/top-right sub-block of the chroma block. Here, the sub-block may be defined as the minimum transform unit for chroma coding.

According to techniques of this disclosure, when the reference line indices have to be explicitly signaled, the possible candidates of reference line indices may be dependent on the intra prediction mode/transform matrix/color component.

According to techniques of this disclosure, instead of utilizing just one reference line for one coding block, it is proposed that multiple reference lines may be utilized to derive the prediction block. In some examples, like in LM parameter derivation process, the neighboring two/more reference lines may be utilized to generate the prediction block. In this case, the reference line index to be signaled may indicate the smaller reference line index.

In another example, a filtering process may be applied to specific multiple reference lines to derive the predictor for one sample. In this case, the signaling of reference line index may not be needed any more. The relative locations of specific reference lines may be dependent on the intra prediction mode/transform matrix/color component. In some examples, for each reference line, a temporary predictor using the conventional intra prediction method may be firstly derived. After that, a filtering process is applied to the multiple temporary predictors to derive the final predictor for one sample. For example, the filtering process may be defined as the linear weighting function wherein the weighting is dependent on the distance between current block and the reference line or the reference line index. In another example, multiple reference lines may be firstly filtered to generate a virtual reference line. Then the conventional intra prediction is applied by utilizing the virtual reference line. In some examples, furthermore, the filtering process may be dependent on the intra prediction mode/transform matrix/ color component. In some examples, furthermore, multiple of filtering processes may be pre-defined. Alternatively, or additionally, furthermore, the candidates of multiple filtering processes may be dependent on the intra prediction mode/ transform matrix/color component. Alternatively, or additionally, furthermore, the index of filtering process within a filtering process candidate set may be signaled.

According to techniques of this disclosure, similar to the proposed methods applied to LM mode, it is proposed that for Cb/Cr inter-prediction mode, the neighboring Cb/Cr row/column used for parameter derivation could be other rows/columns beside the closest row/column. The reference line indices for Cb and Cr components may be the same, e.g., set equal to Refldx/2.

The following is an example manner in which techniques described in this disclosure may be implemented by a video coder. The example implementation technique should not be considered limiting.

Figure 14:
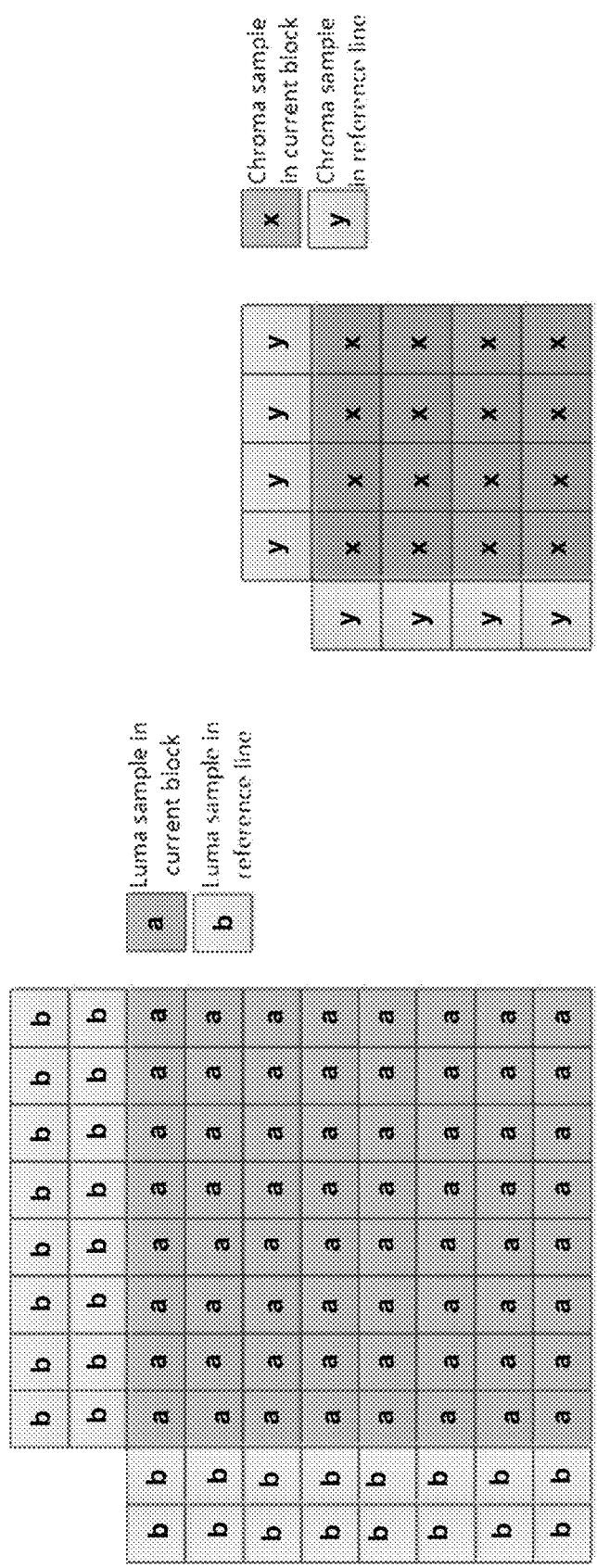
FIG. 14 is a conceptual diagram illustrating example luma and chroma lines when the real RefIdx is equal to 0.
Figure 15:
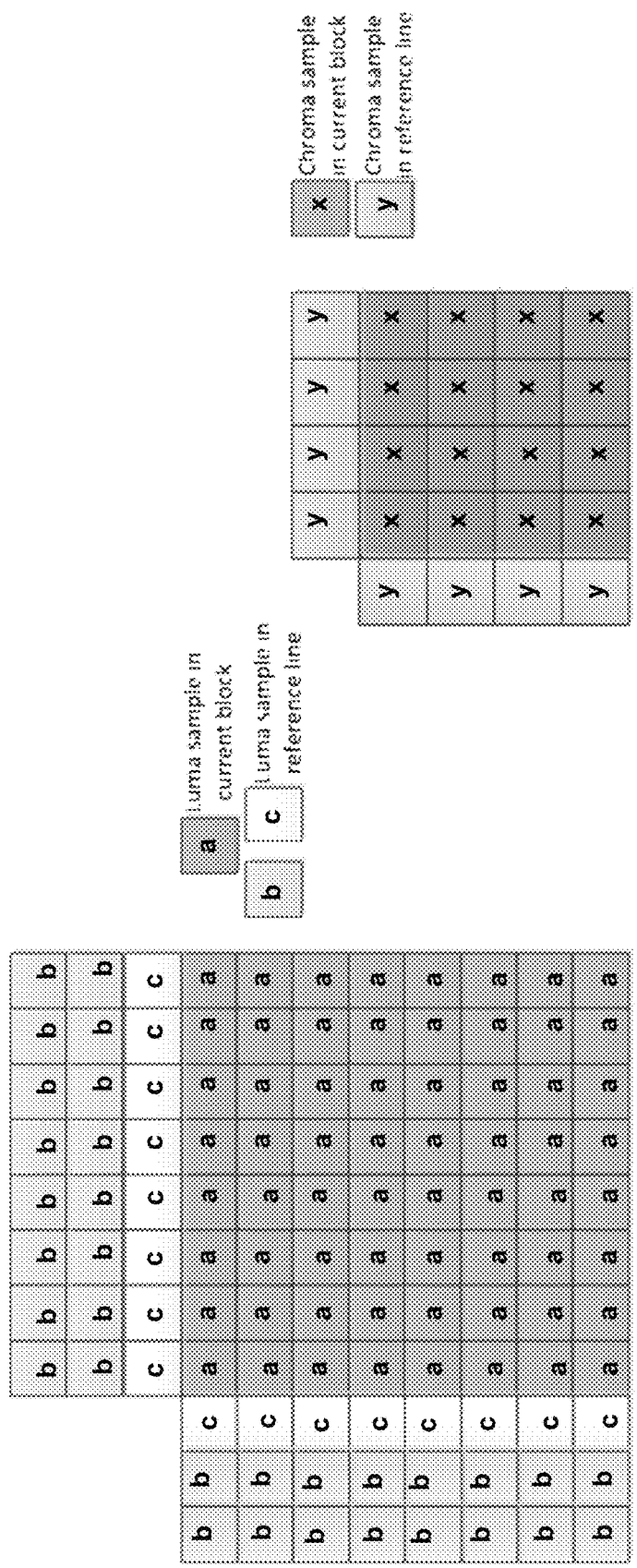
FIG. 15 is a conceptual diagram illustrating example luma and chroma lines when the real RefIdx is equal to 1.
Figure 16:
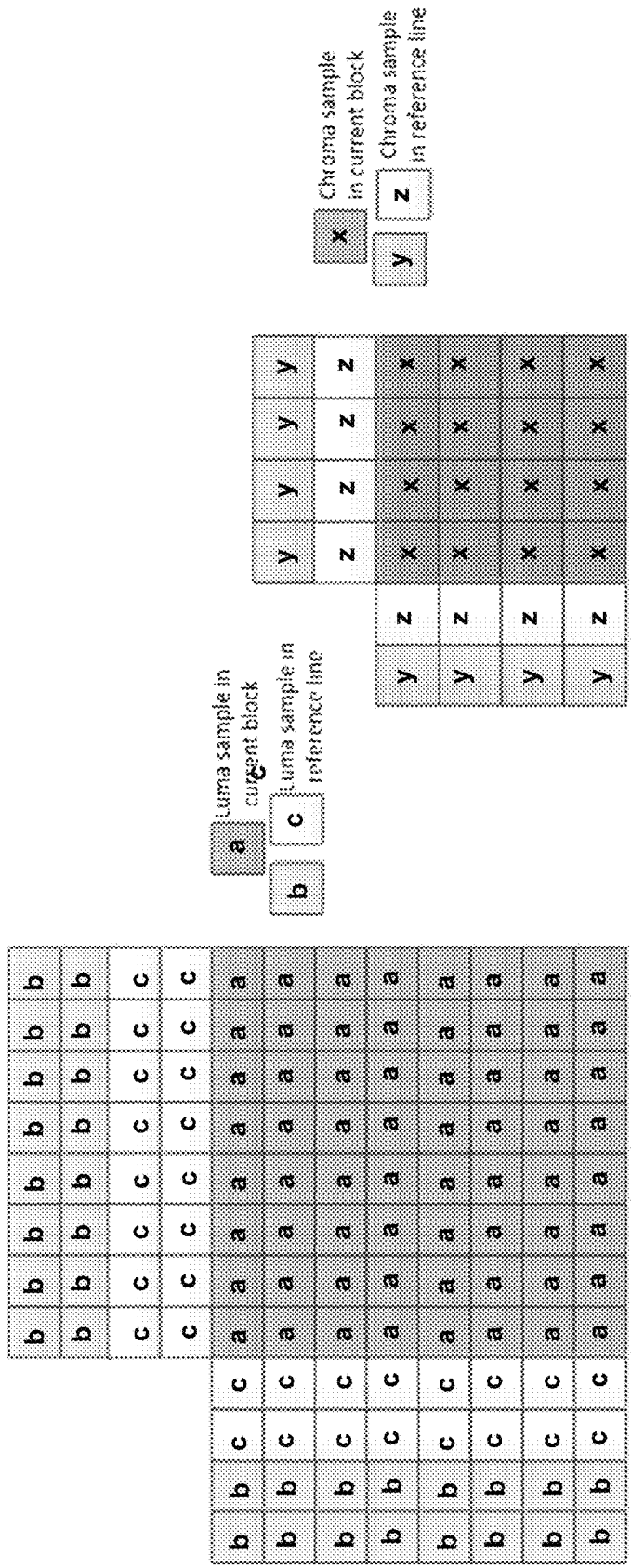
FIG. 16 is a conceptual diagram illustrating example luma and chroma lines when the real RefIdx is equal to 2.

Below is an example of utilized reference lines in LM parameter derivation process, as depicted in FIGS. 14-16. In the examples of FIGS. 14-16, boxes labeled "a" correspond to luma samples in a current block, and boxes labeled "x" correspond to chroma samples in a current block. Boxes labeled "b" correspond to luma samples in already decoded neighboring blocks that may be used for intra prediction and\or may be used for LM parameter derivation. Boxes labeled "y" correspond to chroma samples in already decoded neighboring blocks that may be used for LM parameter derivation. Boxes labeled "c" correspond to luma samples in already decoded neighboring blocks that are not used for LM parameter derivation, and boxes labeled "y" correspond to chroma samples in already decoded neighboring blocks that are not used for LM parameter derivation.

The examples denote the signaled reference line index by RefldxSig and maximum number of reference lines is defined by N (N is a positive integer). Refldx is in the range of [0, N−1], respectively. The real reference line index derived from RefldxSig is represented by Refldx. The closest reference line is represented with Refldx equal to 0. FIG. 14 is a conceptual diagram illustrating example luma and chroma lines when the real Refldx is equal to 0. In some examples, FIG. 14 may be considered, but not limited to, as illustrating that when Refldx is equal to 0, the two closest neighboring lines (e.g., rows and columns) in the neighboring block are used. FIG. 15 is a conceptual diagram illustrating example luma and chroma lines when the real Refldx is equal to 1. In some examples, FIG. 15 may be considered, but not limited to, as illustrating that when Refldx is equal to 1, the two neighboring lines (e.g., rows and columns) after the closest neighboring line in the neighboring block are used. FIG. 16 is a conceptual diagram illustrating example luma and chroma lines when the real Refldx is equal to 2. In some examples, FIG. 16 may be considered, but not limited to, as illustrating that when Refldx is equal to 2, the two neighboring lines (e.g., rows and columns) after the two closest neighboring lines in the neighboring block are used.

It is noted that the above description and figures introduced above give a non-exhaustive list of examples. For some cases, the signaled reference line index may be after some mapping process from the real reference line index. For example, (for example, when N is set to 3, Refldx equal to 2 may represent the 3rd reference line instead of the 2nd reference line. In the descriptions above, when it is not specified, the reference line index denotes the real reference line index, not the signaled one.

In another example, the two luma reference lines and one chroma reference line should be physically aligned. For example, for the case that Refldx is equal to 1, it should be treated in the same way as Refldx equal to 0, as described herein when using 6-tap filter.

Figure 17:
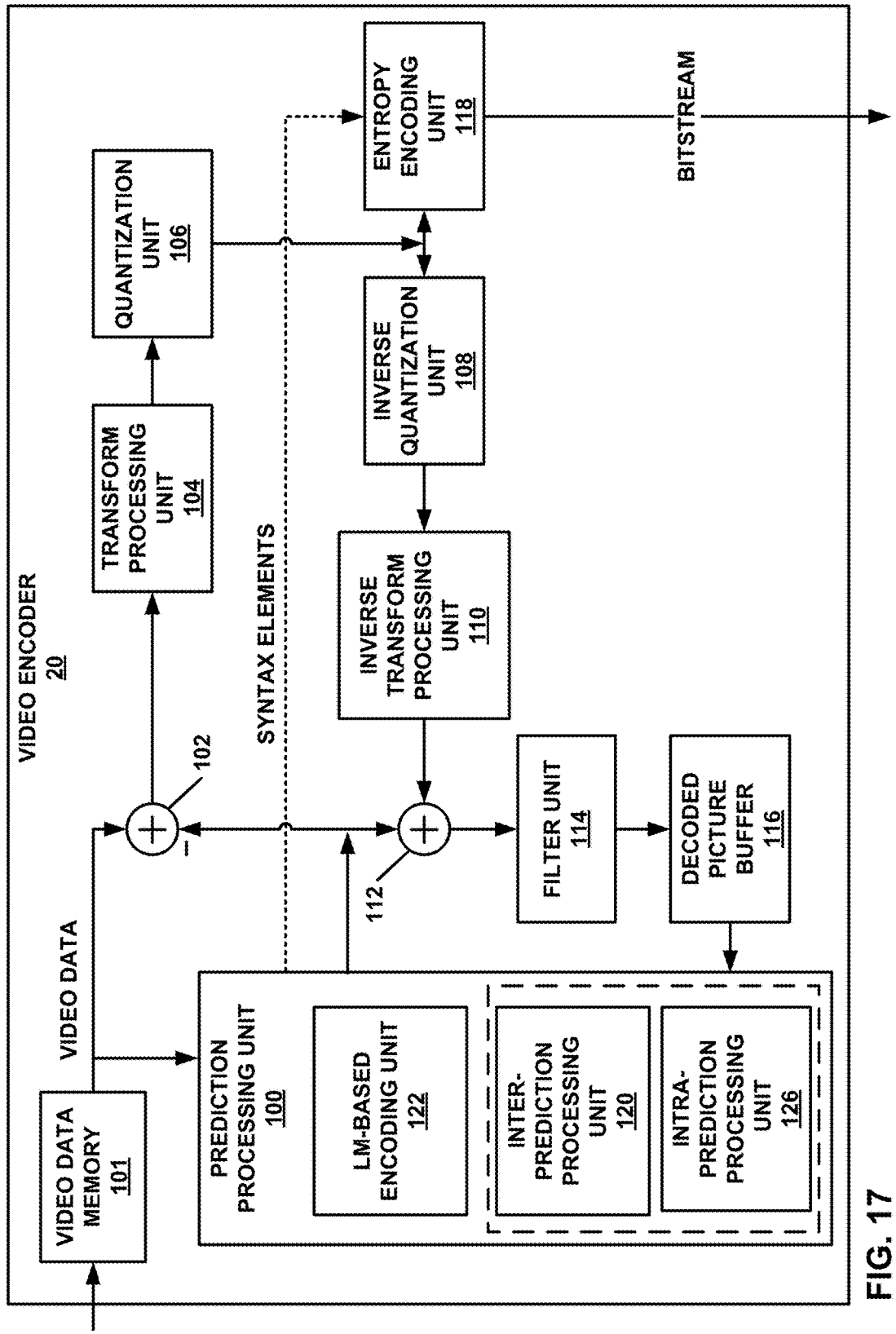
FIG. 17 is a block diagram illustrating an example video encoder that may implement the techniques described in this disclosure.

FIG. 17 is a block diagram illustrating an example video encoder 20 that may implement the techniques of this disclosure. FIG. 17 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for LM-based video coding in accordance with various examples described in this disclosure. For example, video encoder 20 may be configured to code one or more blocks using LM video coding.

In the example of FIG. 17, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a linear model (LM)-based encoding unit 122 configured to perform various aspects of the LM-based coding techniques described in this disclosure. In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20 (e.g., in intra- or inter-coding modes). Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or NxN for intra prediction, and symmetric PU sizes of 2Nx2N, 2NxN, Nx2N, NxN, or similar for inter prediction. Video encoder 20 and video decoder 30 may also support asymmetric partitioning for PU sizes of 2NxnU, 2NxnD, nLx2N, and nRx2N for inter prediction.

Inter-prediction processing unit 120 may generate predictive data for a PU by performing inter prediction on each PU of a CU. The predictive data for the PU may include predictive blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit of inter-prediction processing unit 120 may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit of inter-prediction processing unit 120 may generate the predictive blocks of the PU based at least in part on actual or interpolated samples at the reference regions indicated by the motion vectors of the PU.

LM-based encoding unit 122 may perform the linear model (LM) prediction encoding. For example, LM-based encoding unit 122 may downsample reconstructed luma samples of a luma block that corresponds to a current chroma block that is being encoded. LM-based encoding unit 122 may scale the downsampled reconstructed luma samples of the luma block to generate a predictive block. Residual generation unit 102 may determine a residual block between chroma block and the predictive block. In some examples, LM-based encoding unit 122 may apply such techniques as part of cross-component residual prediction. In this case, the chroma block is a chroma residual block and the luma block is a luma residual block.

In the techniques described in this disclosure, LM-based encoding unit 122 may implement one or more of the above example techniques as part of the downsampling of the luma samples of a luma block. For instance, LM-based encoding unit 122 may apply different filters for downsampling the corresponding luma block based on characteristics of the chroma block being encoded. Examples of the characteristics of the chroma block being decoded include the position of the chroma block being decoded. As another example, LM-based encoding unit 122 may apply padding to the luma block based on luma samples being outside of a particular boundary (e.g., picture, CU, PU, or TU).

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs, the predictive data generated by intra-prediction processing unit 126 for the PUs, or the predictive data generated by LM-based encoding unit 122. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU. Moreover, LM-based encoding unit 122 may utilize reconstructed luma blocks in decoded picture buffer 116 for linear model (LM) prediction encoding a chroma block (where the luma block may include video data in some examples or may be a residual luma block and the chroma block may include video data in some examples or may be a residual chroma block).

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In this manner, the disclosure describes video encoder 20 configured to determine a corresponding luma block for a chroma block that is being encoded, determine a filter to apply to the luma block based on a characteristic of the chroma block, downsample the luma block based on the determined filter, determine a predictive block based on the downsampled luma block, and linear model (LM) prediction encode the chroma block based on the predictive block.

The disclosure also describes video encoder 20 configured to determine a corresponding luma block for a chroma block that is being encoded, based on the luma block extending beyond a boundary, apply padding to a portion of the luma block that extends beyond the boundary and maintains reconstructed samples for the remainder of the luma block to generate a padded luma block, downsamples the padded luma block, determines a predictive block based on the downsampled padded luma block, and linear model (LM) prediction encodes the chroma block based on the predictive block.

Figure 18:
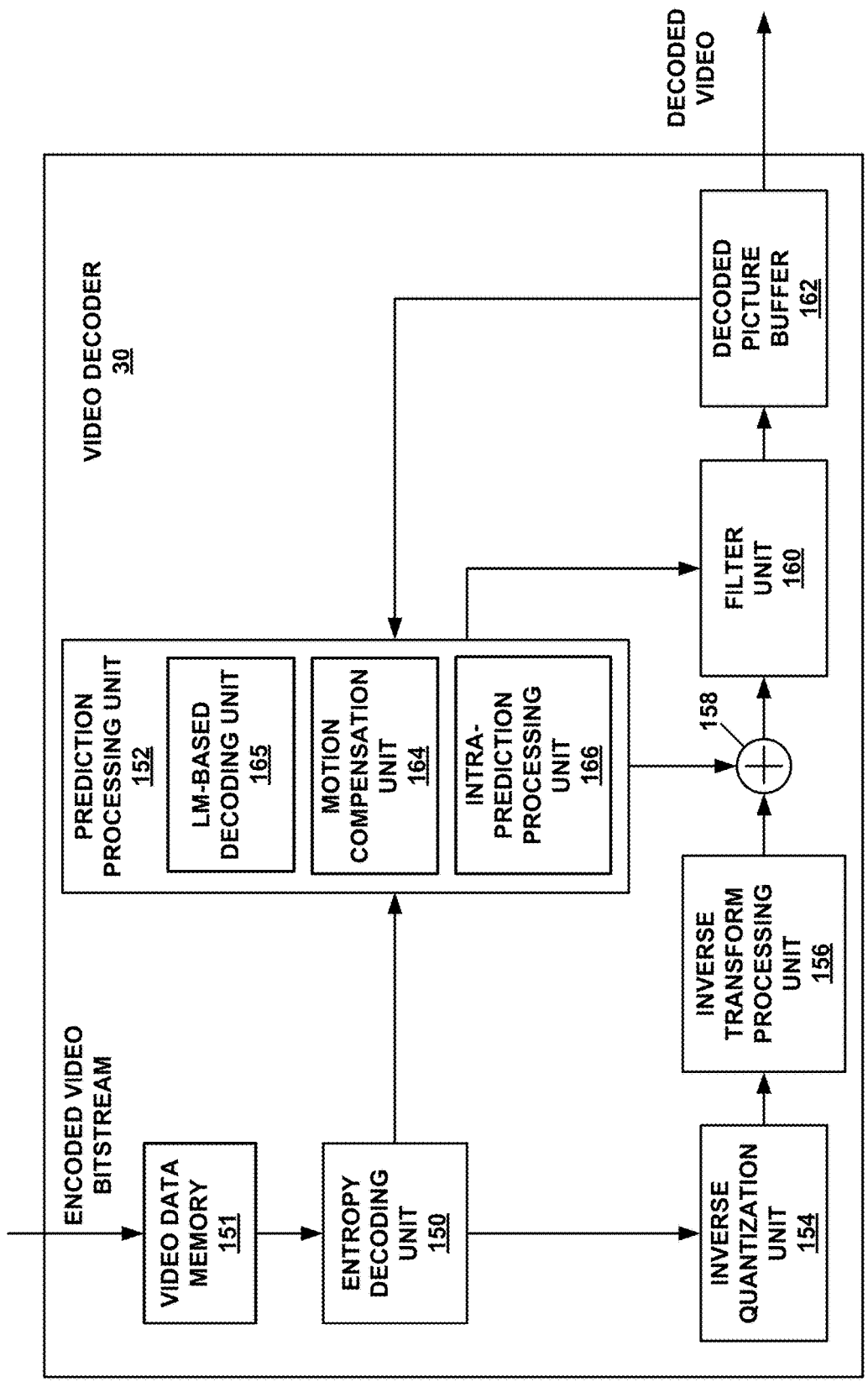
FIG. 18 is a block diagram illustrating an example video decoder that may implement the techniques described in this disclosure.

FIG. 18 is a block diagram illustrating an example video decoder 30 that is configured to implement the techniques of this disclosure. FIG. 18 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video encoder 30 represents an example of a device that may be configured to perform techniques for LM-based video coding in accordance with various examples described in this disclosure. For example, video encoder 30 may be configured to code one or more blocks utilizing LM video coding mode (i.e., linear model (LM) prediction decode one or more blocks).

In the example of FIG. 18, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a linear model (LM)-based decoding unit 165 configured to perform various aspects of the LM-based coding techniques described in this disclosure. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from computer-readable medium 16 (e.g., from a local video source, such as a camera, via wired or wireless network communication of video data, or by accessing physical data storage media). Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAN), or other types of memory devices. Video data memory 151 and decoded picture buffer 162 may be provided by the same memory device or separate memory devices. In various examples, video data memory 151 may be on-chip with other components of video decoder 30, or off-chip relative to those components.

A coded picture buffer (CPB) may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs.

In accordance with various examples of this disclosure, video decoder 30 may be configured to perform LM-based coding. LM-based decoding unit 165, for example, may perform the linear model (LM) prediction decoding. For example, LM-based decoding unit 165 may downsample reconstructed luma samples of a luma block that corresponds to a current chroma block that is being decoded. LM-based decoding unit 165 may scale the downsampled reconstructed luma samples of the luma block to generate a predictive block. Reconstruction unit 158 may then add the generated predictive block to the decoding residual data. In some examples, LM-based decoding unit 165 may apply such techniques as part of cross-component residual prediction. In this case, the chroma block is a chroma residual block and the luma block is a luma residual block.

In the techniques described in this disclosure, LM-based decoding unit 165 may implement one or more of the above example techniques as part of the downsampling of the luma samples of a luma block. For instance, LM-based decoding unit 165 may apply different filters for downsampling the corresponding luma block based on characteristics of the chroma block being decoded. Examples of the characteristics of the chroma block being decoded include the position of the chroma block being decoded. As another example, LM-based decoding unit 165 may apply padding to the luma block based on luma samples being outside of a particular boundary (e.g., picture, CU, PU, or TU).

In this manner, the disclosure describes video decoder 30 configured to determine a corresponding luma block for a chroma block that is being decoded, determine a filter to apply to the luma block based on a characteristic of the chroma block, downsample the luma block based on the determined filter, determine a predictive block based on the downsampled luma block, and linear model (LM) prediction decode the chroma block based on the predictive block.

The disclosure also describes video decoder 30 configured to determine a corresponding luma block for a chroma block that is being decoded, based on the luma block extending beyond a boundary, apply padding to a portion of the luma block that extends beyond the boundary and maintains reconstructed samples for the remainder of the luma block to generate a padded luma block, downsamples the padded luma block, determines a predictive block based on the downsampled padded luma block, and linear model (LM) prediction decodes the chroma block based on the predictive block.

Figure 19:
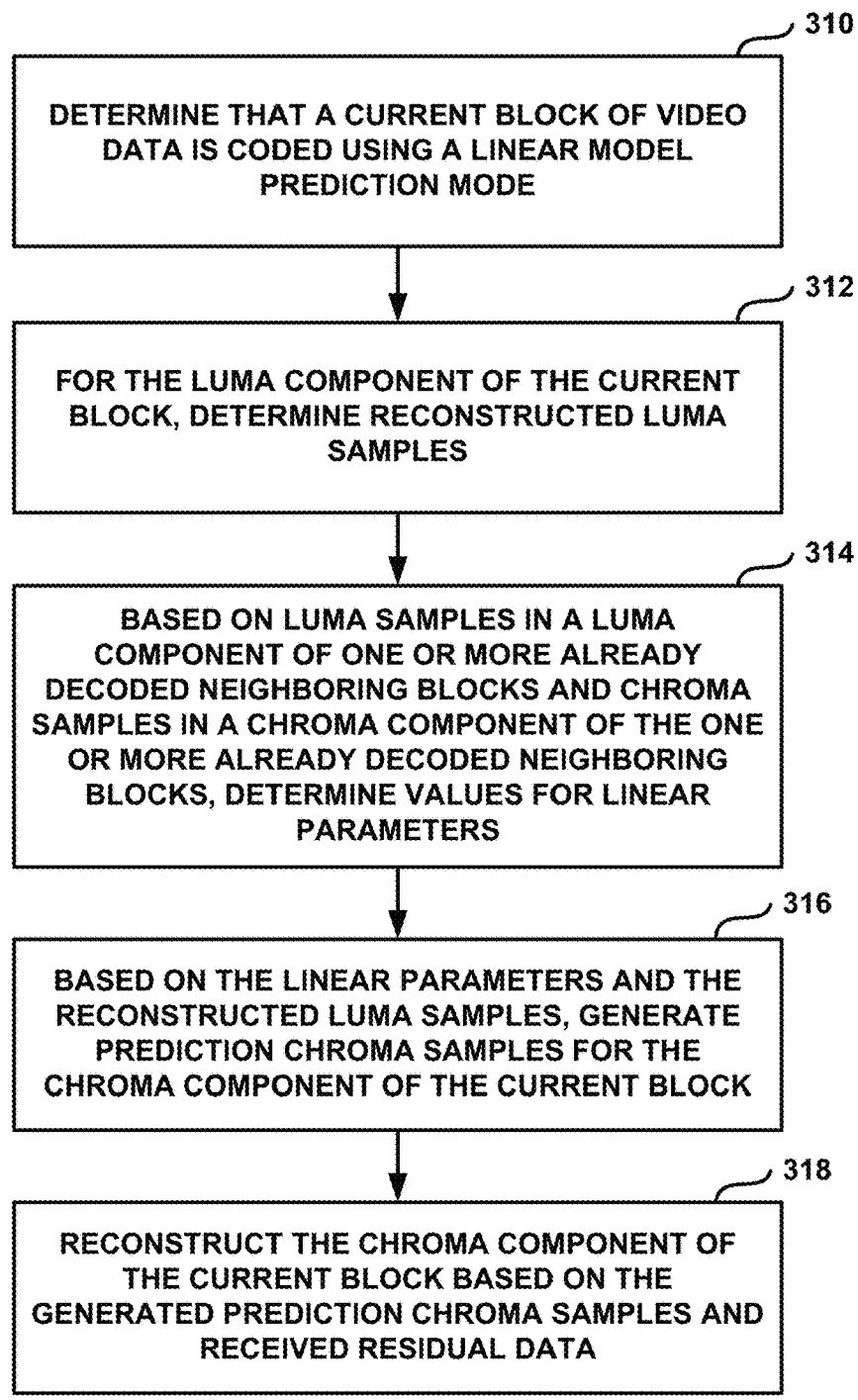
FIG. 19 is a flow diagram illustrating a technique for decoding video data according to aspects of this disclosure.

FIG. 19 is a flowchart showing an example video decoding process according to the techniques of this disclosure. The techniques of FIG. 19 will be described with respect to video decoder 30, although the techniques of FIG. 19 are not limited to any particular type of video decoder. In the example of FIG. 19, video decoder 30 determines that a current block of video data is coded using a linear model prediction mode (310). The linear model prediction mode is used to predict a chroma component of the current block. The current block includes a luma component and at least one chroma component including the chroma component predicted using the linear model prediction mode. For the luma component of the current block, video decoder 30 determines reconstructed luma samples (312). Based on luma samples in a luma component of one or more already decoded neighboring blocks and chroma samples in a chroma component of the one or more already decoded neighboring blocks, video decoder 30 determines values for linear parameters (314). The luma samples in the luma component of the one or more already decoded neighboring blocks may include luma samples from a starting line in the luma component of the one or more already decoded neighboring blocks. The starting line in the luma component of the one or more already decoded neighboring blocks is at least one line removed from a border line of the luma component of the current block.

The luma samples in the luma component of the one or more already decoded neighboring blocks may include luma samples from more than one line of the one or more already decoded neighboring blocks. For example, the luma samples in the luma component of the one or more already decoded neighboring blocks may include luma samples from a starting line in the luma component of the one or more already decoded neighboring blocks that is one line removed from a border line of the luma component of the current block and from a line in the luma component of the one or more already decoded neighboring blocks that is two lines removed from a border line of the luma component of the current block. In another example, the luma samples in the luma component of the one or more already decoded neighboring blocks may include luma samples from a starting line in the luma component of the one or more already decoded neighboring blocks that is two lines removed from a border line of the luma component of the current block and from a line in the luma component of the one or more already decoded neighboring blocks that is three lines removed from a border line of the luma component of the current block.

Based on the linear parameters and the reconstructed luma samples, video decoder 30 generates prediction chroma samples for the chroma component of the current block (316). Video decoder 30 reconstructs the chroma component of the current block based on the generated prediction chroma samples and received residual data (318).

The starting line in the luma component of the one or more already decoded neighboring blocks that is at least one line removed from a border line of the luma component of the current block may include a row in the luma component of the one or more already decoded neighboring blocks that is at least one row removed from a border row of the luma component of the current block. Alternatively or additionally, the starting line in the luma component of the one or more already decoded neighboring blocks that is at least one line removed from a border line of the luma component of the current block may include a column in the luma component of the one or more already decoded neighboring blocks that is at least one column removed from a border column of the luma component of the current block.

The chroma samples in the chroma component of the one or more already decoded neighboring blocks may include chroma samples from a starting line in the chroma component of the one or more already decoded neighboring blocks, wherein the starting line in the chroma component of the one or more already decoded neighboring blocks is at least one line removed from a border line of the chroma component of the current block. The starting line in the chroma component of the one or more already decoded neighboring blocks that is at least one line removed from a border line of the chroma component of the current block may include a row in the chroma component of the one or more already decoded neighboring blocks that is at least one row removed from a border row of the chroma component of the current block. The starting line in the chroma component of the one or more already decoded neighboring blocks that is at least one line removed from a border line of the chroma component of the current block may include a column in the chroma component of the one or more already decoded neighboring blocks that is at least one column removed from a border column of the chroma component of the current block.

Video decoder 30 may determine that the luma component of the current block is coded using an intra prediction mode and determine a reference line index for the luma component of the current block. The reference line index identifies a starting line in the luma component of the one or more already decoded neighboring blocks from which to intra predict luma samples for the luma component of the current block. Based on the reference line index, video decoder 30 determines the starting line in the luma component of the one or more already decoded neighboring blocks to be used for determining the values for the linear parameters. The starting line in the luma component of the one or more already decoded neighboring blocks from which to intra predict luma samples for the luma component of the current block is a same line as the line in the luma component of the one or more already decoded neighboring blocks to be used for determining the values for the linear parameters.

The luma component of the one or more already decoded neighboring blocks may include N available reference lines, where N is a positive integer and each of the N available reference lines has an associated reference index ranging from 0 to N−1. A line closest to the border line of the luma component of the current block has a reference index equal to 0, and a line furthest from the border line of the luma component of the current block has a reference index equal to N−1. According to the techniques of this disclosure, a reference index for the starting line in the luma component of the one or more already decoded neighboring blocks is greater than zero. In other words, the line of the luma component in the already decoded block that is immediately adjacent to the border line of the luma component of the current block may not be used for LM parameter derivation.

The chroma component of the one or more already decoded neighboring blocks may include M reference lines, where M is a positive integer and each of the M reference lines has an associated reference index ranging from 0 to M−1. A line closest to the border line of the chroma component of the current block has a reference index equal to 0, and a line furthest from the border line of the luma component of the current block has a reference index equal to M−1. If the video data includes video data with a 4:4:4 chroma subsampling format, then M may equal N. If the video data includes video data with a 4:2:0 chroma subsampling format, then M may equal N/2.

The techniques described above may be performed by video encoder 20 (FIGS. 1 and 17) and/or video decoder 30 (FIGS. 1 and 18), both of which may be generally referred to as a video coder. Likewise, video coding may refer to video encoding or video decoding, as applicable. In addition, video encoding and video decoding may be generically referred to as "processing" video data.

It should be understood that all of the techniques described herein may be used individually or in combination. This disclosure includes several signaling methods which may change depending on certain factors such as block size, slice type etc. Such variation in signaling or inferring the syntax elements may be known to the encoder and decoder a-priori or may be signaled explicitly in the video parameter set (VPS), sequence parameter set (SPS), picture parameter set (PPS), slice header, at a tile level or elsewhere.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or

What is claimed is:

1. A method for decoding video data, the method comprising:
   determining that a current block of video data is coded using a linear model prediction mode, wherein the linear model prediction mode is used to predict a chroma component of the current block, wherein the current block comprises a luma component and at least one chroma component including the chroma component predicted using the linear model prediction mode;
   determining that the luma component of the current block is coded using an intra prediction mode;
   receiving a syntax element set to a value;
   in response to the value of the syntax element being equal to 2, determining that a reference line index for the luma component of the current block is equal to 3, wherein the reference line index identifies a starting line in the luma component of the one or more already decoded neighboring blocks from which to intra predict luma samples for the luma component of the current block;
   for the luma component of the current block, determining reconstructed luma samples from the intra predicted luma samples;
   based on the reference line index being equal to 3, determining the starting line in the luma component of the one or more already decoded neighboring blocks to be used for determining the values for the linear parameters;
   based on luma samples in a luma component of one or more already decoded neighboring blocks and chroma samples in a chroma component of the one or more already decoded neighboring blocks, determining values for linear parameters, wherein the luma samples in the luma component of the one or more already decoded neighboring blocks comprise luma samples from the starting line in the luma component of the one or more already decoded neighboring blocks, wherein the starting line in the luma component of the one or more already decoded neighboring blocks is at least one line removed from a border line of the luma component of the current block;
   based on the linear parameters and the reconstructed luma samples, generating prediction chroma samples for the chroma component of the current block; and
   reconstructing the chroma component of the current block based on the generated prediction chroma samples and received residual data.

2. The method of claim 1, wherein the chroma samples in the chroma component of the one or more already decoded neighboring blocks comprise chroma samples from a starting line in the chroma component of the one or more already decoded neighboring blocks, wherein the starting line in the chroma component of the one or more already decoded neighboring blocks is at least one line removed from a border line of the chroma component of the current block.

3. The method of claim 1, further comprising:
   based on the reference line index being equal to 3, determining a starting line in the chroma component of the one or more already decoded neighboring blocks to be used for determining the values for the linear parameters, wherein the starting line in the chroma component of the one or more already decoded neighboring blocks is at least one line removed from a border line of the chroma component of the current block.

4. The method of claim 1, wherein the luma component of the one or more already decoded neighboring blocks comprises N available reference lines, wherein N is a positive integer and each of the N available reference lines has an associated reference index ranging from 0 to N−1, wherein a line closest to the border line of the luma component of the current block has a reference index equal to 0 and wherein a line furthest from the border line of the luma component of the current block has a reference index equal to N−1, wherein a reference index for the starting line in the luma component of the one or more already decoded neighboring blocks is greater than zero.

5. The method of claim 4, wherein the chroma component of the one or more already decoded neighboring blocks comprises M reference lines, wherein M is a positive integer and each of the M reference lines has an associated reference index ranging from 0 to M−1, wherein a line closest to the border line of the chroma component of the current block has a reference index equal to 0 and wherein a line furthest from the border line of the luma component of the current block has a reference index equal to M−1.

6. The method of claim 5, wherein the video data comprises video data with a 4:4:4 chroma subsampling format, and wherein M equals N.

7. The method of claim 5, wherein the video data comprises video data with a 4:2:0 chroma subsampling format, and wherein M equals N/2.

8. The method of claim 1, wherein the luma samples in the luma component of the one or more already decoded neighboring blocks comprise luma samples from more than one line of the one or more already decoded neighboring blocks.

9. The method of claim 1, wherein the method for decoding video data is performed as part of a video encoding process.

10. The method of claim 1, further comprising:
    receiving the video data at a receiver of a wireless communication device;
    storing the video data in a memory of the wireless communication device; and
    processing the video data on one or more processors of the wireless communication device.

11. The method of claim 10, wherein the wireless communication device comprises a telephone handset and wherein receiving the video data at the receiver of the wireless communication device comprises demodulating, according to a wireless communication standard, a signal comprising the video data.

12. A device for decoding video data, the device comprising:
    one or more memory devices; and
    one or more processors configured to:
       determine that a current block of video data is coded using a linear model prediction mode, wherein the linear model prediction mode is used to predict a chroma component of the current block, wherein the current block comprises a luma component and at least one chroma component including the chroma component predicted using the linear model prediction mode;
       determine that the luma component of the current block is coded using an intra prediction mode;
       receive a syntax element set to a value;
       in response to the value of the syntax element being equal to 2, determine that a reference line index for the luma component of the current block is equal to 3, wherein the reference line index identifies a starting line in the luma component of the one or more already decoded neighboring blocks from which to intra predict luma samples for the luma component of the current block;

for the luma component of the current block, determine reconstructed luma samples from the intra predicted luma samples;

based on the reference line index being equal to 3, determine the starting line in the luma component of the one or more already decoded neighboring blocks to be used for determining the values for the linear parameters;

based on luma samples in a luma component of one or more already decoded neighboring blocks and chroma samples in a chroma component of the one or more already decoded neighboring blocks, determine values for linear parameters, wherein the luma samples in the luma component of the one or more already decoded neighboring blocks comprise luma samples from the starting line in the luma component of the one or more already decoded neighboring blocks, wherein the starting line in the luma component of the one or more already decoded neighboring blocks is at least one line removed from a border line of the luma component of the current block;

based on the linear parameters and the reconstructed luma samples, generate prediction chroma samples for the chroma component of the current block; and reconstruct the chroma component of the current block based on the generated prediction chroma samples and received residual data.

13. The device of claim 12, wherein the chroma samples in the chroma component of the one or more already decoded neighboring blocks comprise chroma samples from a starting line in the chroma component of the one or more already decoded neighboring blocks, wherein the starting line in the chroma component of the one or more already decoded neighboring blocks is at least one line removed from a border line of the chroma component of the current block.

14. The device of claim 12, wherein the one or more processors are further configured to:

based on the reference line index being equal to 3, determine a starting line in the chroma component of the one or more already decoded neighboring blocks to be used for determining the values for the linear parameters, wherein the starting line in the chroma component of the one or more already decoded neighboring blocks is at least one line removed from a border line of the chroma component of the current block.

15. The device of claim 12, wherein the luma component of the one or more already decoded neighboring blocks comprises N available reference lines, wherein N is a positive integer and each of the N available reference lines has an associated reference index ranging from 0 to N−1, wherein a line closest to the border line of the luma component of the current block has a reference index equal to 0 and wherein a line furthest from the border line of the luma component of the current block has a reference index equal to N−1, wherein a reference index for the starting line in the luma component of the one or more already decoded neighboring blocks is greater than zero.

16. The device of claim 15, wherein the chroma component of the one or more already decoded neighboring blocks comprises M reference lines, wherein M is a positive integer and each of the M reference lines has an associated reference index ranging from 0 to M−1, wherein a line closest to the border line of the chroma component of the current block has a reference index equal to 0 and wherein a line furthest from the border line of the luma component of the current block has a reference index equal to M−1.

17. The device of claim 16, wherein the video data comprises video data with a 4:4:4 chroma subsampling format, and wherein M equals N.

18. The device of claim 16, wherein the video data comprises video data with a 4:2:0 chroma subsampling format, and wherein M equals N/2.

19. The device of claim 12, wherein the luma samples in the luma component of the one or more already decoded neighboring blocks comprise luma samples from more than one line of the one or more already decoded neighboring blocks.

20. The device of claim 12, wherein the device comprises a wireless communication device, further comprising a receiver configured to receive encoded video data.

21. The device of claim 20, wherein the wireless communication device comprises a telephone handset and wherein the receiver is configured to demodulate, according to a wireless communication standard, a signal comprising the encoded video data.

22. A non-transitory computer-readable storage medium storing instructions that when executed cause one or more processors of a device for coding video data to:

determine that a current block of video data is coded using a linear model prediction mode, wherein the linear model prediction mode is used to predict a chroma component of the current block, wherein the current block comprises a luma component and at least one chroma component including the chroma component predicted using the linear model prediction mode;

determine that the luma component of the current block is coded using an intra prediction mode;

receive a syntax element set to a value;

in response to the value of the syntax element being equal to 2, determine that a reference line index for the luma component of the current block is equal to 3, wherein the reference line index identifies a starting line in the luma component of the one or more already decoded neighboring blocks from which to intra predict luma samples for the luma component of the current block;

for the luma component of the current block, determine reconstructed luma samples from the intra predicted luma samples;

based on the reference line index being equal to 3, determine the starting line in the luma component of the one or more already decoded neighboring blocks to be used for determining the values for the linear parameters;

based on luma samples in a luma component of one or more already decoded neighboring blocks and chroma samples in a chroma component of the one or more already decoded neighboring blocks, determine values for linear parameters, wherein the luma samples in the luma component of the one or more already decoded neighboring blocks comprise luma samples from the starting line in the luma component of the one or more already decoded neighboring blocks, wherein the starting line in the luma component of the one or more already decoded neighboring blocks is at least one line removed from a border line of the luma component of the current block;

based on the linear parameters and the reconstructed luma samples, generate prediction chroma samples for the chroma component of the current block; and reconstruct the chroma component of the current block based on the generated prediction chroma samples and received residual data.

23. The non-transitory computer-readable storage medium of claim 22, wherein the chroma samples in the chroma component of the one or more already decoded neighboring blocks comprise chroma samples from a starting line in the chroma component of the one or more already decoded neighboring blocks, wherein the starting line in the chroma component of the one or more already decoded neighboring blocks is at least one line removed from a border line of the chroma component of the current block.

24. The non-transitory computer-readable storage medium of claim 22, wherein the one or more processors are further configured to:

based on the reference line index being equal to 3, determine a starting line in the chroma component of the one or more already decoded neighboring blocks to be used for determining the values for the linear parameters, wherein the starting line in the chroma component of the one or more already decoded neighboring blocks is at least one line removed from a border line of the chroma component of the current block.

25. The non-transitory computer-readable storage medium of claim 22, wherein the luma component of the one or more already decoded neighboring blocks comprises N available reference lines, wherein N is a positive integer and each of the N available reference lines has an associated reference index ranging from 0 to N−1, wherein a line closest to the border line of the luma component of the current block has a reference index equal to 0 and wherein a line furthest from the border line of the luma component of the current block has a reference index equal to N−1, wherein a reference index for the starting line in the luma component of the one or more already decoded neighboring blocks is greater than zero.

26. The non-transitory computer-readable storage medium of claim 25, wherein the chroma component of the one or more already decoded neighboring blocks comprises M reference lines, wherein M is a positive integer and each of the M reference lines has an associated reference index ranging from 0 to M−1, wherein a line closest to the border line of the chroma component of the current block has a reference index equal to 0 and wherein a line furthest from the border line of the luma component of the current block has a reference index equal to M−1.

27. The non-transitory computer-readable storage medium of claim 26, wherein the video data comprises video data with a 4:4:4 chroma subsampling format, and wherein M equals N.

28. The non-transitory computer-readable storage medium of claim 26, wherein the video data comprises video data with a 4:2:0 chroma subsampling format, and wherein M equals N/2.

29. The non-transitory computer-readable storage medium of claim 22, wherein the luma samples in the luma component of the one or more already decoded neighboring blocks comprise luma samples from more than one line of the one or more already decoded neighboring blocks.

30. A device for decoding video data, the device comprising:

means for determining that a current block of video data is coded using a linear model prediction mode, wherein the linear model prediction mode is used to predict a chroma component of the current block, wherein the current block comprises a luma component and at least one chroma component including the chroma component predicted using the linear model prediction mode;

means for determining that the luma component of the current block is coded using an intra prediction mode;

means for receiving a syntax element set to a value;

means for determining that a reference line index for the luma component of the current block is equal to 3 in response to the value of the syntax element being equal to 2, wherein the reference line index identifies a starting line in the luma component of the one or more already decoded neighboring blocks from which to intra predict luma samples for the luma component of the current block;

means for determing reconstructed luma samples for the luma component of the current block;

means for determining values for linear parameters based on luma samples in a luma component of one or more already decoded neighboring blocks and chroma samples in a chroma component of the one or more already decoded neighboring blocks, wherein the luma samples in the luma component of the one or more already decoded neighboring blocks comprise luma samples from the starting line in the luma component of the one or more already decoded neighboring blocks, wherein the starting line in the luma component of the one or more already decoded neighboring blocks is at least one line removed from a border line of the luma component of the current block;

means for generating prediction chroma samples for the chroma component of the current block based on the linear parameters and the reconstructed luma samples; and means for reconstructing the chroma component of the current block based on the generated prediction chroma samples and received residual data.

* * * * *